United States Patent
Feng et al.

(10) Patent No.: US 12,271,236 B2
(45) Date of Patent: Apr. 8, 2025

(54) ROTATION MECHANISM, SUPPORTING APPARATUS, AND FOLDABLE SCREEN TERMINAL

(71) Applicant: HONOR DEVICE CO., LTD., Shenzhen (CN)

(72) Inventors: Lei Feng, Shenzhen (CN); Yameng Wei, Shenzhen (CN); Haifei Li, Shenzhen (CN); Yangjie Tang, Shenzhen (CN); Yuan Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/027,659

(22) PCT Filed: Sep. 2, 2022

(86) PCT No.: PCT/CN2022/116902
§ 371 (c)(1),
(2) Date: Mar. 22, 2023

(87) PCT Pub. No.: WO2023/045738
PCT Pub. Date: Mar. 30, 2023

(65) Prior Publication Data
US 2024/0302868 A1    Sep. 12, 2024

(30) Foreign Application Priority Data
Sep. 26, 2021    (CN) .......................... 202111131614.X

(51) Int. Cl.
*G06F 1/16*    (2006.01)

(52) U.S. Cl.
CPC .......... *G06F 1/1681* (2013.01); *G06F 1/1652* (2013.01)

(58) Field of Classification Search
CPC .... G06F 1/1652; G06F 1/1681; G06F 1/1683; G06F 1/1684; G06F 1/1686;
(Continued)

(56) References Cited

U.S. PATENT DOCUMENTS 4,597,656 A    7/1986    Yamashita
9,348,450 B1 *    5/2016    Kim ..................... H04M 1/0268
(Continued)

FOREIGN PATENT DOCUMENTS

CN    110035143 A    7/2019
CN    110958337 A    4/2020
(Continued)

*Primary Examiner* — Abhishek M Rathod

(57) ABSTRACT

This application provides a rotation mechanism, a supporting apparatus, and a foldable screen terminal, and relates to the field of electronic device technologies, so as to balance a lifting stroke of the lifting member and a thickness of the foldable screen terminal in an unfolded state. The rotation mechanism includes a lifting member, a shaft cover, a first swing arm, a second swing arm, a forcing structure, and a first supporting member. The lifting member includes a lamination surface. The shaft cover is located on a side that is of the lifting member and that is away from the lamination surface. The first swing arm and the second swing arm are respectively located on two opposite sides of the lifting member, and the first swing arm and the second swing arm can swing between an unfolded position and a folded position relative to the shaft cover.

13 Claims, 15 Drawing Sheets

(58) Field of Classification Search
CPC ........ G06F 1/1679; G06F 1/16; G06F 1/1601;
G06F 1/1605; G06F 1/1609; G06F
1/1613; G06F 1/1615; G06F 1/1616;
G06F 1/1618; H04M 1/0268; H04M
1/022; H04M 1/0249; H04M 1/026;
H04M 1/0262; H04M 1/03; H04M 1/04;
H04M 1/05; H05K 5/00; H05K 5/028;
H05K 5/0217
See application file for complete search history.

(56) References Cited

U.S. PATENT DOCUMENTS

| | | | |
|---|---|---|---|
| 11,336,759 | B2 | 5/2022 | Liao et al. |
| 12,010,254 | B2 * | 6/2024 | Liu ........................ H04M 1/022 |
| 2015/0233162 | A1 * | 8/2015 | Lee ........................ H04M 1/022 16/223 |
| 2020/0363843 | A1 * | 11/2020 | Cheng ................... G06F 1/1681 |
| 2021/0165466 | A1 * | 6/2021 | Kang ................... H04B 1/3833 |
| 2021/0247815 | A1 | 8/2021 | Shim et al. |
| 2022/0311847 | A1 | 9/2022 | Zhao et al. |
| 2022/0321683 | A1 | 10/2022 | Luo et al. |
| 2024/0259487 | A1 * | 8/2024 | Sun ........................ G06F 1/1616 |

FOREIGN PATENT DOCUMENTS

| | | |
|---|---|---|
| CN | 111147630 A | 5/2020 |
| CN | 111698355 A | 9/2020 |
| CN | 113067924 A | 7/2021 |
| CN | 113067925 A | 7/2021 |
| CN | 113067926 A | 7/2021 |
| CN | 113194183 A | 7/2021 |
| CN | 113315860 A | 8/2021 |
| CN | 114333593 A | 4/2022 |

* cited by examiner

ROTATION MECHANISM, SUPPORTING APPARATUS, AND FOLDABLE SCREEN TERMINAL

This application is a national stage of International Application No. PCT/CN2022/116902, filed on Sep. 2, 2022, which claims priority to Chinese Patent Application No. 202111131614.X, filed on Sep. 26, 2021. The disclosures of both of the aforementioned applications are hereby incorporated by reference in their entireties.

TECHNICAL FIELD

This application relates to the field of foldable screen terminal technologies, in particular, to a rotation mechanism, a supporting apparatus, and a foldable screen terminal.

BACKGROUND

With the advancement in science and technology, an era of a large-screen intelligent terminal is approaching. To resolve a problem that a conventional tablet computer is large in volume and inconvenient to carry, and a problem that a screen of a mobile phone is small, a foldable screen terminal emerges.

The foldable screen terminal implements large-screen display in an unfolded state. When the foldable screen is folded inward, the screen starts to be bent. When the screen is in a folded state, a folded portion of the screen has a specific amount of downward movement compared with the portion of the screen in the unfolded state. If a component in the foldable screen terminal does not avoid the screen here, the screen body will be unreliable. In the conventional technology, many components avoid a middle portion of the screen, and consequently a thickness of the foldable screen terminal is large, and it is difficult to implement lightening and thinning of the foldable screen terminal.

SUMMARY

Embodiments of this application provide a rotation mechanism, a supporting apparatus, and a foldable screen terminal, so as to reduce a thickness of the foldable screen terminal and facilitate lightening and thinning of the foldable screen terminal.

To achieve the foregoing objective, the following technical solutions are used in embodiments of this application:

According to a first aspect, some embodiments of this application provide a rotation mechanism, including a lifting member, a shaft cover, a first swing arm, a second swing arm, a forcing structure, and a first supporting member, where the lifting member includes a lamination surface, and the lamination surface is used for lamination to a part of a foldable screen; the shaft cover is located on a side that is of the lifting member and that is away from the lamination surface; the first swing arm and the second swing arm are respectively located on two opposite sides of the lifting member, and the first swing arm and the second swing arm can swing between an unfolded position and a folded position relative to the shaft cover; the forcing structure is located between the lifting member and the shaft cover, and one end of the forcing structure is connected to the lifting member, and the other end thereof is connected to the shaft cover; and the first supporting member is relatively fastened to the first swing arm or the second swing arm.

When the first swing arm and the second swing arm are in the unfolded position, the lifting member is supported on the first supporting member, and the forcing structure applies a tensile force directed to the shaft cover to the lifting member; and when the first swing arm and the second swing arm swing from the unfolded position to the folded position, the first supporting member moves toward the shaft cover, and the lifting member descends under an action of the tension force of the forcing structure.

In the rotation mechanism provided in this embodiment of this application, the forcing structure is located between the lifting member and the shaft cover, one end of the forcing structure is connected to the lifting member, and the other end thereof is connected to the shaft cover, that is, the forcing structure is directly connected between the lifting member and the shaft cover. Therefore, a thickness of the rotation mechanism is small, thereby facilitating thinning of the foldable screen terminal.

In a possible implementation of the first aspect, when the first swing arm and the second swing arm swing from the folded position to the unfolded position, the first supporting member moves toward the lifting member to apply a support force to the lifting member, and the support force can overcome the tensile force of the forcing structure to drive the lifting member to ascend. Therefore, the lifting member can be driven to ascend, to stably support a middle portion of the foldable screen when the first swing arm and the second swing arm are in the unfolded position.

In a possible implementation of the first aspect, the forcing structure is an elastic member, one end that is of the elastic member and that is along a telescopic direction is connected to the lifting member, and the other end thereof along a telescopic direction is connected to the shaft cover; and when the first swing arm and the second swing arm are in the unfolded position, the elastic member applies an elastic tensile force directed to the shaft cover to the lifting member, and when the first swing arm and the second swing arm swing from the unfolded position to the folded position, the lifting member descends under an action of the elastic tensile force of the forcing structure. An elastic structure has good stability, is widely used, and can be easily implemented.

In a possible implementation of the first aspect, the elastic member is a tower spring. Because the tower spring is a spiral spring whose spiral radius gradually decreases, compared with a cylindrical spiral spring, a larger quantity of spiral rings can be formed through spiraling in the tower spring on a premise that a size in the telescopic direction is fixed, so that elasticity of the tower spring is better. In addition, on a premise that the elasticity is the same, a height of the tower spring can be designed to be small, so that a distance between the lifting member and the shaft cover can be reduced, thereby facilitating thinning of the foldable screen terminal.

In a possible implementation of the first aspect, the tower spring includes two ends along the telescopic direction, a smaller-diameter end thereof is connected to the lifting member, and a larger-diameter end thereof is connected to the shaft cover. In this way, space on a peripheral side of the smaller-diameter end of the tower spring is relatively large, so that the first rotating shaft, the second rotating shaft, the first swing arm, and the second swing arm can be avoided, to reduce a width of the rotation mechanism.

In a possible implementation of the first aspect, the forcing structure may alternatively be a cylindrical spiral spring, a spring sheet, a leaf spring, a rubber band, or the like.

In a possible implementation of the first aspect, the forcing structure may alternatively be a magnetic body assembly including a magnetic body and a magnetic conductive member; the magnetic body in the magnetic body assembly includes, but is not limited to, a magnet and a magnetic steel; and one of the magnetic body and the magnetic conductive member is fastened to the lifting member and the other is fastened to the shaft cover, and the magnetic body and the magnetic conductive member are spared apart from each other. In this way, the magnetic body and the magnetic conductive member are attracted to each other to generate a magnetic attraction force, so as to drive the lifting member to descend by using the magnetic attraction force.

In a possible implementation of the first aspect, the lifting member includes a lifting member body and a buckling member; a mounting hole is disposed on the lifting member body, the mounting hole penetrates through the lifting member body along a lifting direction of the lifting member, the mounting hole allows the buckling member to be mounted into the mounting hole from one end that is of the mounting hole and that is away from the elastic member; after the buckling member is mounted into the mounting hole, the mounting hole also prevents the buckling member from being separated from the mounting hole from one end that is of the mounting hole and that is close to the elastic member; and the elastic member is detachably connected to the buckling member. In this way, the lifting member, the forcing structure, and the shaft cover may be assembled as follows: First, one end of the forcing structure is fastened to an inner surface of the shaft cover; next, the lifting member body of the lifting member is disposed on a side that is of the forcing structure and that is away from the shaft cover, and the mounting hole is opposite to the other end of the forcing structure; then, the other end of the forcing structure is pulled out from the mounting hole to a side that is of the lifting member body and that is away from the shaft cover, and is connected to the buckling member; and finally, the buckling member connected to the forcing structure is mounted into the mounting hole of the lifting member body, to complete assembly. This assembly operation is not difficult and can be easily implemented, and operation of mounting the forcing structure in a narrow gap between the lifting member and the shaft cover is avoided.

In a possible implementation of the first aspect, the mounting hole includes a first hole segment and a second hole segment, the second hole segment is located on a side that is of the first hole segment and that is close to the elastic member, and a cross section area of the second hole segment is smaller than a cross section area of the first hole segment; and the buckling member includes a supporting portion and a fastening portion, the supporting portion matches and is accommodated in the first hole segment, and the fastening portion matches and is accommodated in the second hole segment. This structure is simple and can be easily implemented.

In a possible implementation of the first aspect, the rotation mechanism further includes a guide post and a guide sleeve; and one of the guide post and the guide sleeve is disposed on the lifting member, and the other is disposed on the shaft cover, an axis direction of the guide post and an axis direction of the guide sleeve coincide with the lifting direction of the lifting member, the guide post is sleeved in the guide sleeve, and the guide post slides in the guide sleeve relative to the guide sleeve when the lifting member descends or ascends relative to the shaft cover. In this way, the guide post and the guide sleeve can guide a lifting movement of the lifting member, to prevent the lifting member from being misaligned during lifting.

In a possible implementation of the first aspect, a first stop member is fastened on the shaft cover, and the first stop member includes a first surface region; a second stop member is fastened on the lifting member, and the second stop member includes a second surface region; and when the first swing arm and the second swing arm are in the folded position, the first stop member is laminated with the second surface region of the second stop member by using the first surface region. Therefore, the first stop member and the second stop member cooperate with the forcing structure to limit the lifting member, so as to maintain a position of the lifting member when the first swing arm and the second swing arm are in the folded position, and prevent the position of the lifting member from moving due to an external force.

Based on the foregoing implementation, optionally, when the first swing arm and the second swing arm are in the folded position, the tensile force that is applied by the forcing structure to the lifting member and that is directed to the shaft cover is greater than zero. In this way, the forcing structure presses the lifting member against the first stop member, to improve stability of the position of the lifting member and prevent an external impact force from forcing the position of the lifting member to change.

In a possible implementation of the first aspect, both the first surface region and the second surface region are inclined relative to the lamination surface, and when the first swing arm and the second swing arm are in the folded position, a frictional coefficient between the first surface region and the second surface region is greater than a reciprocal of a tangent value of an inclination angle of the first surface region or the second surface region. In this way, when an outer surface of the shaft cover is impacted by an external force, the external force is transferred to an inner side of the shaft cover to the first stop member, and the first stop member cannot drive the second stop member and the lifting member to move. Therefore, the position of the lifting member is further maintained.

In a possible implementation of the first aspect, a quantity of the first surface regions is two, the two first surface regions are disposed symmetrically with respect to a plane parallel to the lifting direction of the lifting member, a quantity of the second surface regions is also two, and the two second surface regions are disposed symmetrically with respect to the plane parallel to the lifting direction of the lifting member; and when the first swing arm and the second swing arm are in the folded position, the two first surface regions of the first stop member are respectively laminated with the two second surface regions of the second stop member. In this way, forces applied when the first stop member abuts against the second stop member is balanced, to prevent the rotation mechanism from being stuck during lifting of the lifting member.

In a possible implementation of the first aspect, the first supporting member is relatively fastened to the first swing arm, the rotation mechanism further includes a second supporting member, and the second supporting member is relatively fastened to the second swing arm; when the first swing arm and the second swing arm are in the unfolded position, the lifting member is supported on the first supporting member and the second supporting member; and when the first swing arm and the second swing arm swing from the unfolded position to the folded position, both the first supporting member and the second supporting member move toward the shaft cover. In this way, in the unfolded state, the support force applied to the lifting member is more stable, thereby ensuring stability of the position of the lifting member.

According to a second aspect, some embodiments of this application provide a supporting apparatus, where the supporting apparatus includes a first housing, a second housing, and the rotation mechanism described in any one of the foregoing technical solutions, the rotation mechanism is located between the first housing and the second housing, a first swing arm of the rotation mechanism is connected to the first housing, and a second swing arm of the rotation mechanism is connected to the second housing.

The supporting apparatus provided in this embodiment of this application includes the rotation mechanism described in any one of the foregoing technical solutions, so that both can resolve a same technical problem and achieve a same effect.

According to a third aspect, some embodiments of this application provide a foldable screen terminal, where the foldable screen terminal includes a foldable screen and the supporting apparatus as described in the foregoing technical solution; and the foldable screen includes a first part, a second part, and a third part, the third part is located between the first part and the second part, the first part is supported and fastened on a first housing, the second part is supported and fastened on a second housing, and the third part is supported on a rotation mechanism of the supporting apparatus.

The foldable screen terminal provided in this embodiment of this application includes the supporting apparatus described in any one of the foregoing technical solutions, so that both can resolve a same technical problem and achieve a same effect.

DESCRIPTION OF EMBODIMENTS

In embodiments of this application, the terms "first", "second", and "third" are used for descriptive purposes only, and cannot be construed as indicating or implying relative importance or implicitly indicating the quantity of technical features indicated. Therefore, the features defined with "first", "second" and "third" may explicitly or implicitly include one or more of the features.

In the embodiments of this application, the term "including", "containing" or any other variant thereof is intended to cover non-exclusive inclusion, so that a process, method, article or apparatus including a series of elements includes not only those elements, but also other elements not explicitly listed, or elements inherent to such a process, method, article or apparatus. Without further limitation, the element defined by the sentence "including a . . . " does not exclude that other identical elements are also present in the process, method, article or apparatus including the element.

This application provides a foldable screen terminal, and the foldable screen terminal is a foldable screen terminal with a foldable screen. Specifically, the foldable screen terminal includes, but is not limited to, a mobile phone, a tablet personal computer (tablet personal computer), a laptop computer (laptop computer), a personal digital assistant (personal digital assistant, PDA), and the like.

Figure 1:
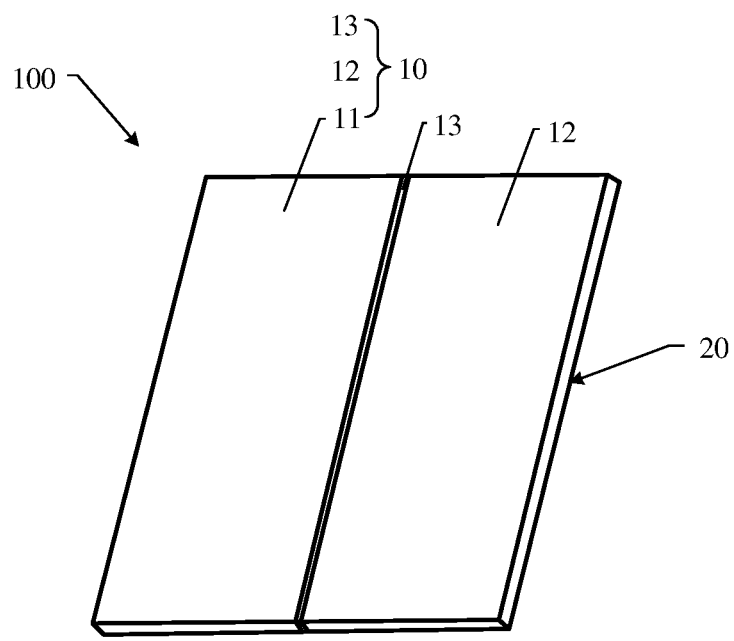
FIG. 1 is a perspective view of a foldable screen terminal according to some embodiments of this application.

FIG. 1 is a perspective view of a foldable screen terminal 100 according to some embodiments of this application. This embodiment is described by using a mobile phone as an example of the foldable screen terminal 100. The foldable screen terminal 100 includes a foldable screen 10 and a supporting apparatus 20. It can be understood that FIG. 1 shows only some example components included in the foldable screen terminal 100. Actual shapes, actual sizes, actual positions, and actual configurations of these components are not limited by FIG. 1.

The foldable screen 10 is configured to display an image, a video, and the like. The foldable screen 10 may be folded into a first part 11 and a second part 12. The foldable screen 10 further includes a third part 13 located between the first part 11 and the second part 12. At least the third part 13 of the foldable screen 10 is made of a flexible material. The first part 11 and the second part 12 may be made of a flexible material, or may be made of a rigid material; or a part of the first part 11 and the second part 12 is made of a rigid material, and the other part thereof is made of a flexible material. This is not specifically limited herein.

Specifically, the foldable screen 10 may be an organic light-emitting diode (organic light-emitting diode, OLED) screen, a micro organic light-emitting diode (micro organic light-emitting diode) screen, a quantum dot light emitting diodes (quantum dot light emitting diodes, QLED) screen, a liquid crystal display (liquid crystal display, LCD), or the like.

Figure 2:
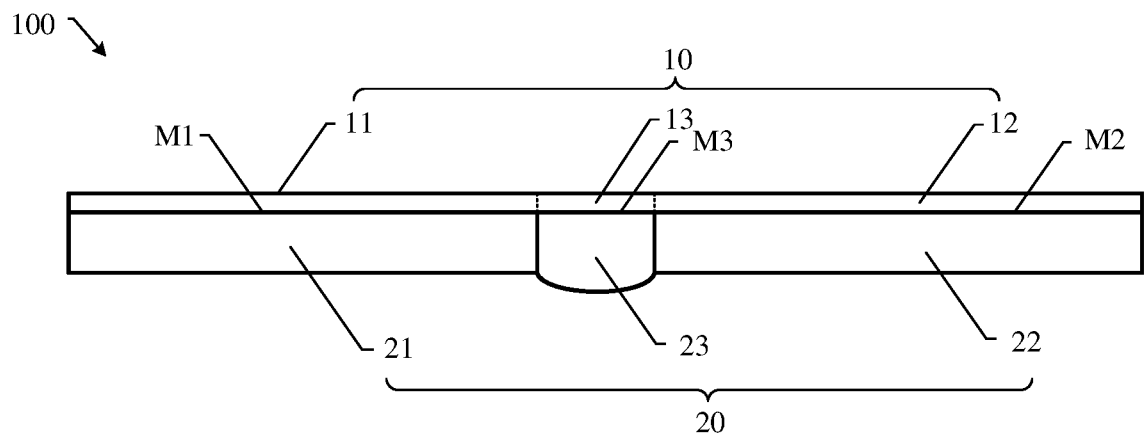
FIG. 2 is a front view of the foldable screen terminal shown in FIG. 1.

FIG. 2 is a front view of the foldable screen terminal 100 shown in FIG. 1. The foldable screen 10 is supported on the supporting apparatus 20. In some embodiments, still referring to FIG. 2, the supporting apparatus 20 includes a first housing 21, a second housing 22, and a rotation mechanism 23. The first housing 21 is configured to fasten and support the first part 11 of the foldable screen 10. Specifically, the first housing 21 includes a lamination surface M1, and the first housing 21 is configured to fasten and support the first part 11 of the foldable screen 10 in FIG. 1 by using the lamination surface M1. The second housing 22 is configured to fasten and support the second part 12 of the foldable screen 10 in FIG. 1. Specifically, the second housing 22 includes a lamination surface M2, and the second housing 22 is configured to fasten and support the second part 12 of the foldable screen 10 in FIG. 1 by using the lamination surface M2. The rotation mechanism 23 is configured to support the third part 13 of the foldable screen 10. Specifically, the rotation mechanism 23 includes a lamination surface M3, and the rotation mechanism 23 is configured to fasten and support the third part 13 of the foldable screen 10 by using the lamination surface M3. The rotation mechanism 23 is connected between the first housing 21 and the second housing 22, and the first housing 21 and the second housing 22 are rotatably connected by using the rotation mechanism 23, to enable the foldable screen terminal 100 to rotate between an unfolded state and a folded state.

FIG. 1 and FIG. 2 each are a schematic diagram of a structure of the foldable screen terminal 100 in the unfolded state. When the foldable screen terminal 100 is in the unfolded state, the lamination surface M1, the lamination surface M2, and the lamination surface M3 are coplanar, to open the foldable screen 10 and ensure flatness of the foldable screen 10. In this state, large-screen display can be implemented, which can provide richer information to a user and improve user experience.

Figure 3:
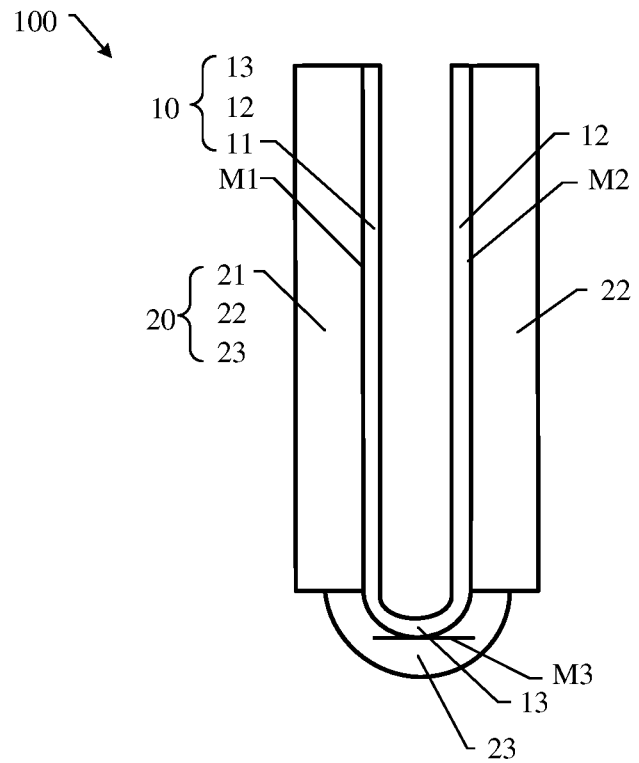
FIG. 3 is a schematic diagram of a structure of the foldable screen terminal shown in FIG. 2 in a folded state.

FIG. 3 is a schematic diagram of a structure of the foldable screen terminal shown 100 in FIG. 2 in a folded state; When the foldable screen terminal 100 is in the folded state, the first part 11 is opposite to the second part 12, and the third part 13 is in the folded state. The supporting apparatus 20 is outside the foldable screen 10, and the user cannot see the foldable screen 10, to prevent the foldable screen 10 from being scratched by a hard object.

Figure 4:
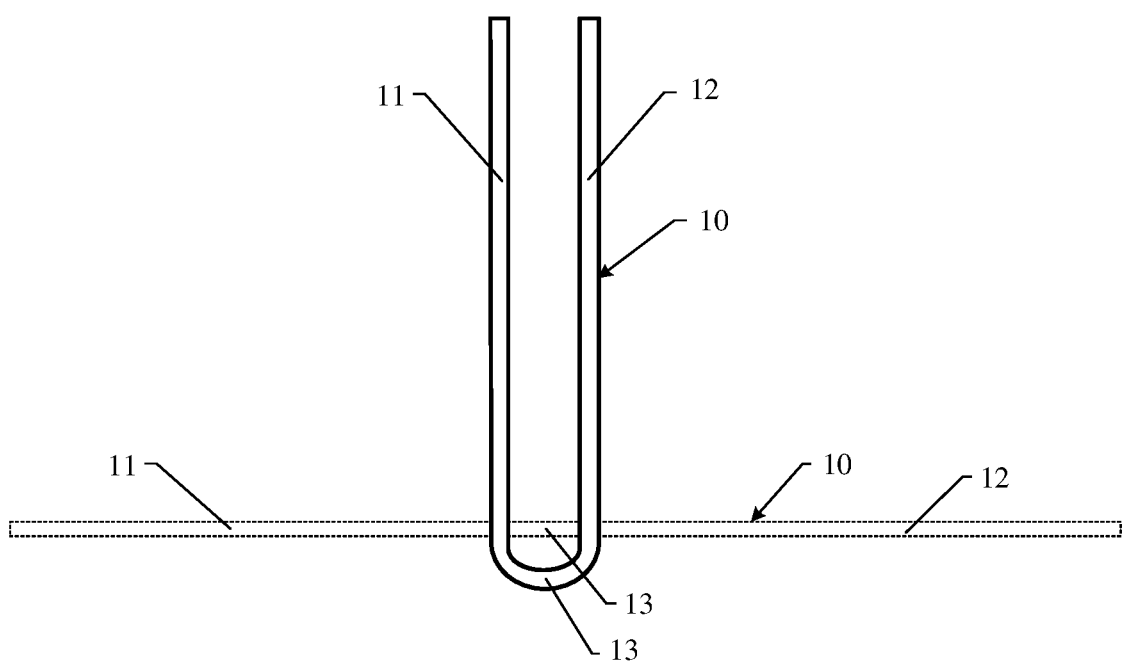
FIG. 4 is a schematic diagram showing relative positions of a screen in the foldable screen terminal shown in FIG. 1 to FIG. 3 in an unfolded state and a folded state.

FIG. 4 is a schematic diagram showing relative positions of a foldable screen 10 in the foldable screen terminal 100 shown in FIG. 1 to FIG. 3 in an unfolded state and a folded state. In FIG. 4, the foldable screen 10 is in the unfolded state as shown by a dotted line, and the foldable screen 10 is in the folded state as shown by a solid line. A middle portion (that is, the third part 13) of the foldable screen 10 in the folded state has a specific amount of downward movement compared with the middle portion of the foldable screen 10 in the unfolded state. If the rotation mechanism 23 in the supporting apparatus 20 does not avoid the portion of the foldable screen 10, the foldable screen 10 will be unreliable.

Figure 5:
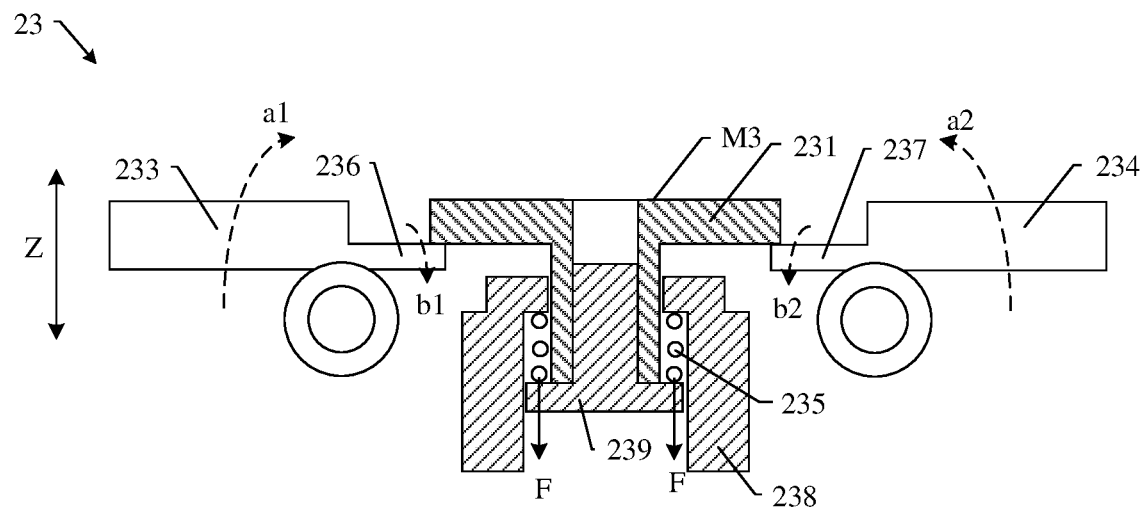
FIG. 5 is a schematic diagram of a structure of a rotation mechanism according to this application.
Figure 6:
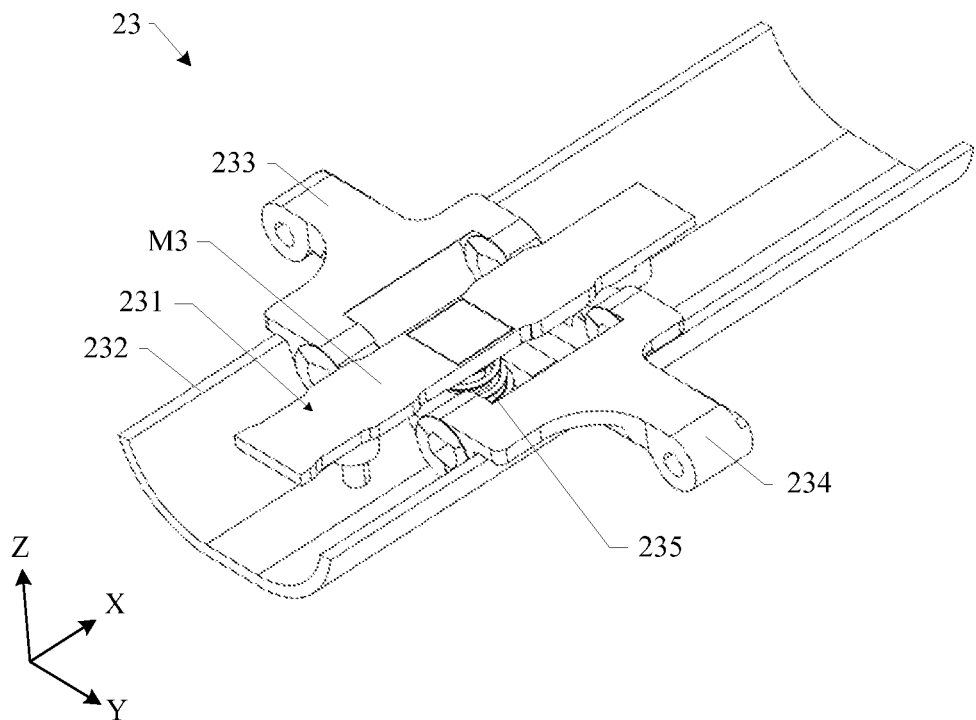
FIG. 6 is a perspective view of a rotation mechanism according to some embodiments of this application.

To avoid the middle portion of the foldable screen 10, referring to FIG. 5, FIG. 5 is a schematic diagram of a structure of a rotation mechanism 23 according to this application. The rotation mechanism 23 includes a lifting member 231, a fastening base 238, a screw 239, a forcing structure 235, a first swing arm 233, a second swing arm 234, a first supporting member 236, and a second supporting member 237.

The first swing arm 233 and the second swing arm 234 are respectively located on two opposite sides of the lifting member 231. The first swing arm 233 is connected to the first housing 21 in FIG. 2 and FIG. 3, the second swing arm 234 is connected to the second housing 22 in FIG. 2 and FIG. 3, and both the first swing arm 233 and the second swing arm 234 are rotatable relative to the fastening base 238. Relative positions of the fastening base 238 and each of a rotation axis of the first swing arm 233 and a rotation axis of the second swing arm 234 are fixed. In this way, the first housing 21 is rotatably connected to the second housing 22, so that the foldable screen terminal can rotate between the unfolded state and the folded state.

Based on this, a lamination surface M3 is formed on the lifting member 231. The fastening base 238 and the screw 239 are located on a side that is of the lifting member 231 and that is away from a lamination surface M3. The screw 239 is fastened to the lifting member 231, and the screw 239 and a part of the lifting member 231 slidably penetrate into the fastening base 238 along a lifting direction of the lifting member 231. The forcing structure 235 is connected between the fastening base 238 and the screw 239, and the forcing structure 235 is a compression spring. The first supporting member 236 is fastened on the first swing arm 233, and optionally, the first supporting member 236 and the first swing arm 233 are an integral structural member. The second supporting member 237 is fastened on the second swing arm 234, and optionally, the second supporting member 237 and the second swing arm 234 are an integral structural member.

When the foldable screen terminal is in the unfolded state, referring to FIG. 5, the lifting member 231 is supported on the first supporting member 236 and the second supporting member 237, and the forcing structure 235 is in a compressed state, to apply an elastic tensile force F away from the lifting member 231 to the screw 239. When the foldable screen terminal is rotated from the unfolded state to the folded state, the first swing arm 233 and the second swing arm 234 swing upward along a direction a1 and a direction a2 respectively, the first supporting member 236 and the second supporting member 237 swing downward along a direction b1 and a direction b2 respectively, and the screw 239 and the lifting member 231 descend under an action of the elastic tensile force of the forcing structure 235. When the foldable screen terminal is in the folded state, the forcing structure 235 is in a free state. Then, when the foldable screen terminal is rotated from the folded state to the unfolded state, the first supporting member 236 and the second supporting member 237 swing upward along an opposite direction of the direction b1 and an opposite direction of the direction b2 respectively, to drive the lifting member 231 to ascend. In addition, the forcing structure 235 compresses, to accumulate an elastic tensile force, thereby facilitating a next descending operation of the lifting member 231.

The rotation mechanism 23 includes many components, and a thickness of the rotation mechanism 23 (that is, a size along a direction of Z axis in FIG. 5) is a superposition of a partial lifting member 231, a partial screw 239, a partial fastening base 238, the forcing structure 235, and a lifting stroke of the lifting member 231. Consequently, a thickness of the rotation mechanism 23 is large, which does not facilitate lightening and thinning of the foldable screen terminal.

Figure 7:
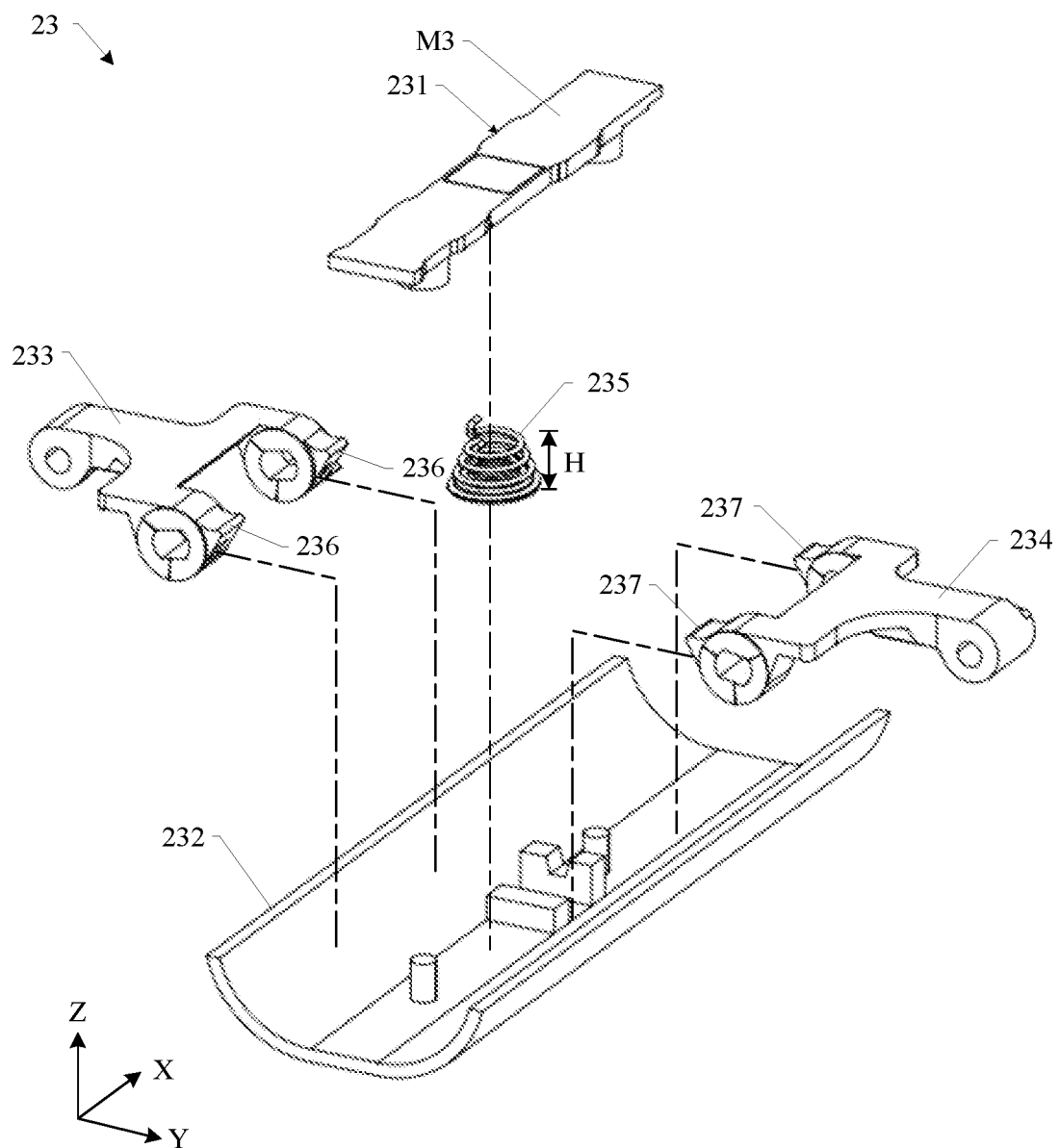
FIG. 7 is an exploded view of the rotation mechanism shown in FIG. 6.
Figure 8:
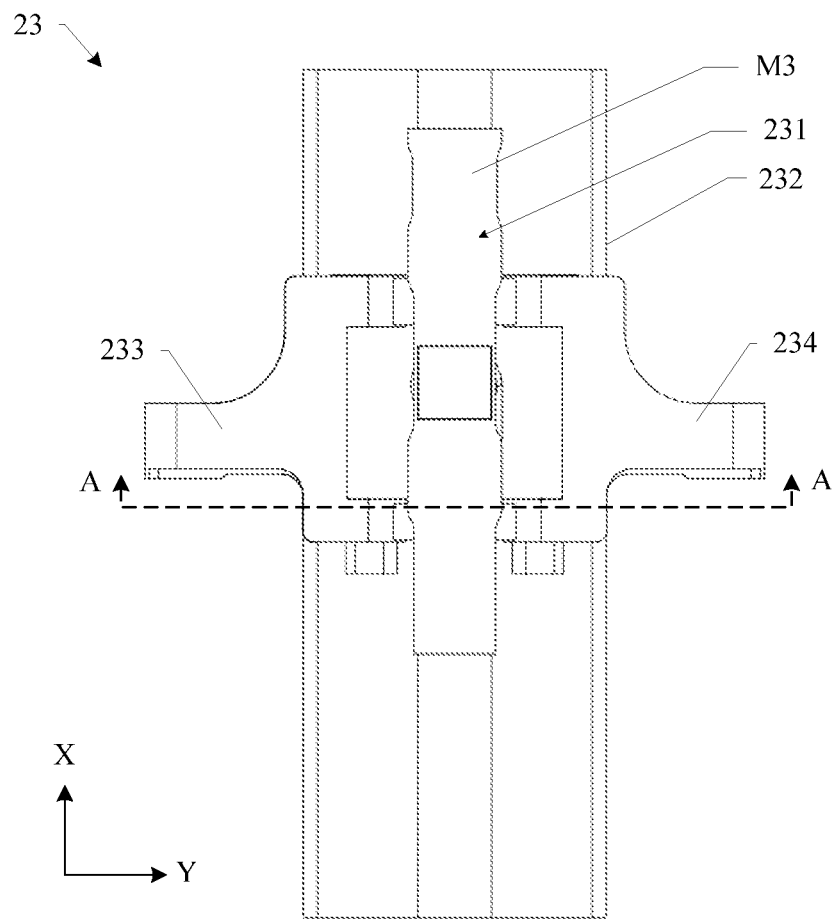
FIG. 8 is a top view of the rotation mechanism shown in FIG. 6.
Figure 9:
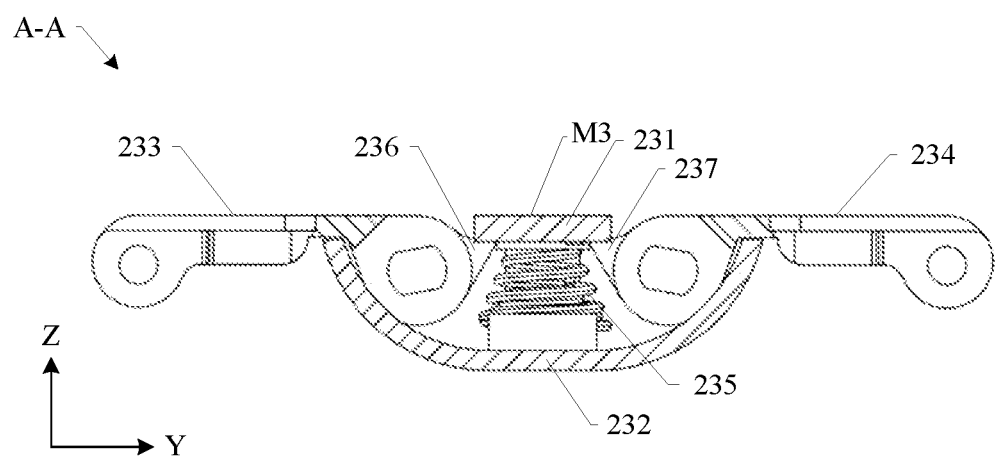
FIG. 9 is a schematic diagram of a structure of a cross section of the rotation mechanism shown in FIG. 8 at line A-A.

To resolve the foregoing problem, referring to FIG. 6 to FIG. 9, FIG. 6 is a perspective view of a rotation mechanism 23 according to some embodiments of this application; FIG. 7 is an exploded view of the rotation mechanism 23 shown in FIG. 6; FIG. 8 is a top view of the rotation mechanism 23 shown in FIG. 6; and FIG. 9 is a schematic diagram of a structure of a cross section of the rotation mechanism 23 shown in FIG. 8 at line A-A. The rotation mechanism 23 described in this embodiment includes a lifting member 231, a shaft cover 232, a first swing arm 233, a second swing arm 234, a forcing structure 235, a first supporting member 236, and a second supporting member 237.

To facilitate description of the following embodiments, an XYZ coordinate system is established, and a length direction of the rotation mechanism 23 is defined as the X axis direction, a width direction of the rotation mechanism 23 is defined as the Y axis direction, and the thickness direction of the rotation mechanism 23 is defined as the Z axis direction. It may be understood that a coordinate system of the rotation mechanism 23 may be flexibly set according to an actual need, and this application only shows an example, which cannot be considered as a special limitation to this application.

The first swing arm 233 and the second swing arm 234 are respectively located on two opposite sides of the lifting member 231. The first swing arm 233 is connected to the first housing 21 in FIG. 2 and FIG. 3, and the second swing arm 234 is connected to the second housing 22 in FIG. 2 and FIG. 3. Specifically, the first swing arm 233 and the first housing 21, and the second swing arm 234 and the second housing 22 may be fixedly connected, may be slidably connected, or is rotatably connected. This is not limited in this embodiment of this application. In addition, the first swing arm 233 and the first housing 21, and the second swing arm 234 and the second housing 22 may be directly connected, or may be indirectly connected by using another middle structure. This is not specifically limited herein, provided that, when the foldable screen terminal rotates between an unfolded state and a folded state, a swing direction of the first swing arm 233 coincides with a rotation direction of the first housing 21 and a swing direction of the second swing arm 234 coincides with a rotation direction of the second housing 22.

The first swing arm 233 and the second swing arm 234 can swing between an unfolded position and a folded position relative to the shaft cover (232). When the first swing arm 233 and the second swing arm 234 are in the unfolded position, the foldable screen terminal is in the unfolded state; or when the first swing arm 233 and the second swing arm 234 are in the folded position, the foldable screen terminal is in the folded state.

Figure 10:
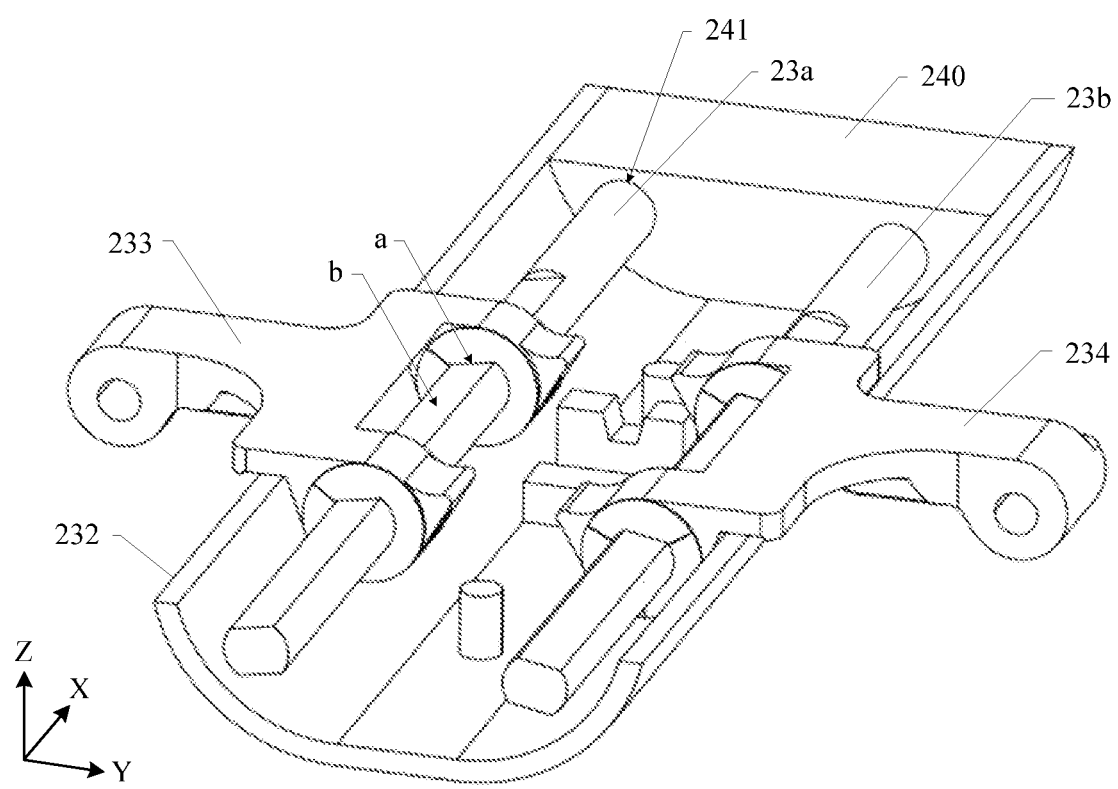
FIG. 10 is an assembly diagram of a first swing arm, a second swing arm, a shaft cover, and a base in FIG. 6 to FIG. 9.

In some embodiments, relative positions of the shaft cover 232 and each of a rotation axis of the first swing arm 233 and a rotation axis of the second swing arm 234 are fixed. To meet this condition, referring to FIG. 10, FIG. 10 is an assembly diagram of a first swing arm 233, a second swing arm 234, a shaft cover 232 and a base 240 in FIG. 6 to FIG. 9. The rotation mechanism 23 further includes the base 240, and the base 240 is fastened to the shaft cover 232. The first swing arm 233 is rotatably connected to the base 240 by using a first rotating shaft 23a, and the second swing arm 234 is rotatably connected to the base 240 by using a second rotating shaft 23b. In this way, the relative positions of the shaft cover 232 and each of the rotation axis of the first swing arm 233 and the rotation axis of the second swing arm 234 are fixed by using the base 240, the first rotating shaft 23a, and the second rotating shaft 23b.

Specifically, a rotatable connection manner of the first swing arm 233 is the same as a rotatable connection manner of the second swing arm 234, and the following only uses the rotatable connection manner of the first swing arm 233 as an example for description. Specifically, the rotatable connection manner of the first swing arm 233 may include the following Example 1 and Example 2.

Example 1

Referring to FIG. 10, the first swing arm 233 is fixedly connected to the first rotating shaft 23a. Optionally, the first swing arm 233 is provided with a flat hole a, and the first rotating shaft 23a includes a flat shaft section b. The first swing arm 233 is sleeved onto the flat shaft section b of the first rotating shaft 23a by using the flat hole a, to prevent the first swing arm 233 from rotating around the first rotating shaft 23a, so that the first swing arm 233 is fixedly connected to the first rotating shaft 23a. The "flat hole" described in this embodiment and the following embodiments refers to a hole whose inner wall includes a plane portion. Correspondingly, the flat shaft is a shaft on which a plane portion is formed through milling or the like on a side surface. The flat hole cooperates with the flat shaft, to prevent the hole and the shaft from relatively rotating. In some other embodiments, the first swing arm 233 and the first rotating shaft 23a may alternatively be fastened together through interference fitting between a rotating shaft and a hole, welding, or the like. Based on this, the first rotating shaft 23a is rotatably connected to the base 240 by using the first rotating shaft 23a as an axis. Specifically, in some embodiments, still referring to FIG. 10, a first rotation hole 241 is disposed on the base 240, and the first rotating shaft 23a penetrates into the first rotation hole 241 and can rotate in the first rotation hole 241.

Figure 11:
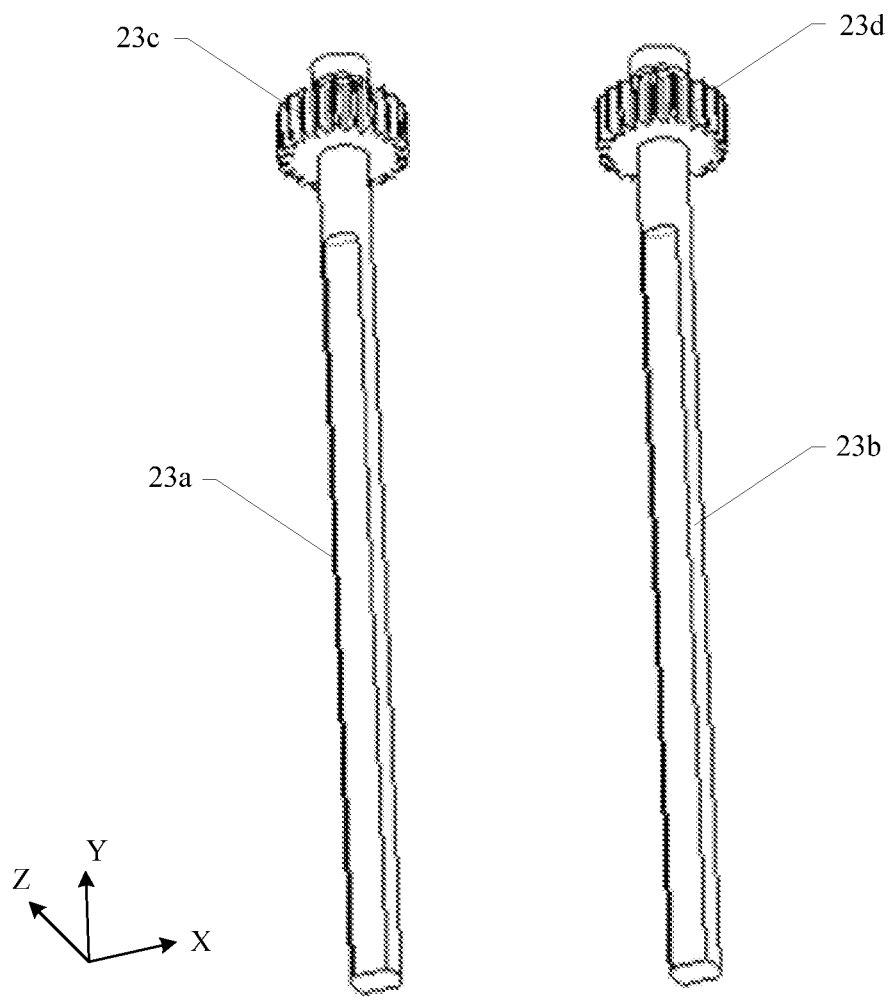
FIG. 11 is a schematic diagram of a structure of each of a first rotating shaft and a second rotating shaft in a rotation mechanism according to some embodiments of this application.

In the foregoing example, when the first swing arm 233 rotates relative to the base 240, the first rotating shaft 23a rotates accordingly. Because the rotatable connection manner of the second swing arm 234 is the same as the rotatable connection manner of the first swing arm 233, when the second swing arm 234 rotates relative to the base 240, the second rotating shaft 23b rotates accordingly. Based on this, a transmission gear may be disposed on each of the first rotating shaft 23a and the second rotating shaft and 23b. For example, referring to FIG. 11, FIG. 11 is a schematic diagram of a structure of each of a first rotating shaft 23a and a second rotating shaft 23b in a rotation mechanism 23 according to some embodiments of this application. A first gear 23c is fastened on the first rotating shaft 23a. A center axis of the first gear 23c is collinear with a center axis of the first rotating shaft 23a. A second gear 23d is fastened on the second rotating shaft 23b. A center axis of the second gear 23d is collinear with a center axis of the second rotating shaft 23b. A diameter of the first gear 23c is equal to that of the second gear 23d. The first gear 23c is engaged with the second gear 23d for transmission. Alternatively, an even quantity of middle gears are disposed between the first gear 23c and the second gear 23d, and the first gear 23c, the even quantity of middle gears, and the second gear 23d are sequentially engaged for transmission. In this way, the first swing arm 233 and the second swing arm 234 can be driven to swing synchronously along opposite directions by using the first gear 23c and the second gear 23d, or by using the first gear 23c, the even quantity of middle gears, and the second gear 23d.

Figure 12:
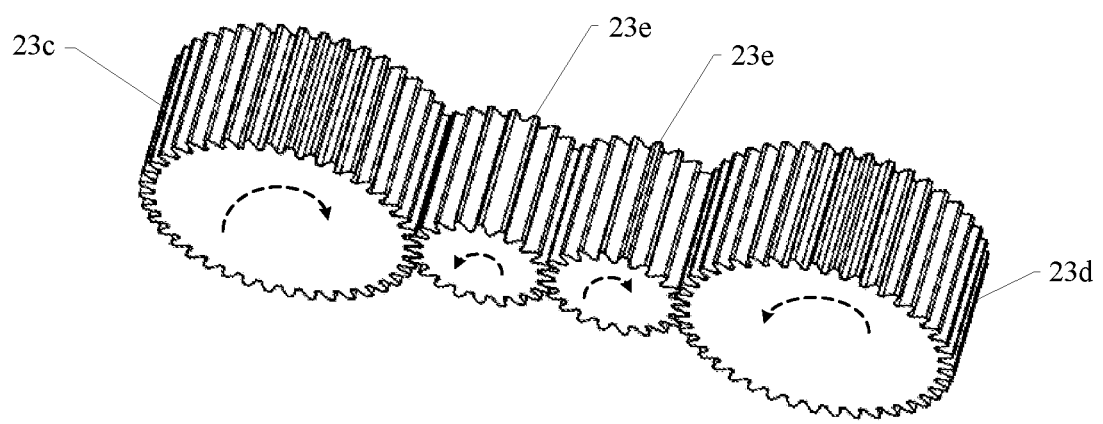
FIG. 12 is an assembly diagram of a first gear, a middle gear, and a second gear in a rotation mechanism according to some embodiments of this application.

In the foregoing embodiment, a quantity of the middle gears may be two, four, six, or the like, and as the quantity of the middle gears increases, a diameter of the middle gear, a diameter of the first gear 23c, and a diameter of the second gear 23d may be designed small, to reduce a height of the rotation mechanism 23 in the Z axis direction. However, as the quantity of middle gears increases, structural complexity of the rotation mechanism 23 increases. Therefore, to balance the height and the structural complexity of the rotation mechanism 23, in some embodiments, referring to FIG. 12, FIG. 12 is an assembly diagram of a first gear 23c, a middle gear 23e, and a second gear 23d in a rotation mechanism 23 according to some embodiments of this application. In this embodiment, the quantity of the middle gears 23e is two. In this way, the quantity of middle gears 23e is moderate, to balance the height and the structural complexity of the rotation mechanism 23.

Example 2

A rotation hole (not shown in the figure) is disposed on the first swing arm 233, the first swing arm 233 is sleeved onto the first rotating shaft 23a by using the rotation hole and can rotate around the first rotating shaft 23a, and the first rotating shaft 23a is fastened to the base 240. In this way, when the first swing arm 233 rotates relative to the base 240, the first rotating shaft 23a is fixed relative to the base 240. This structure is simple and can be easily implemented.

Based on the foregoing descriptions, the first housing 21 is rotatably connected to the second housing 22 by using the rotation mechanism 23, so that the foldable screen terminal can rotate between the unfolded state and the folded state.

Based on the foregoing, referring back to FIG. 6 to FIG. 9, the lifting member 231 includes the lamination surface M3, the lamination surface M3 is the lamination surface M3 in the foldable screen terminal shown in FIG. 2 and FIG. 3, and the lamination surface M3 is used for lamination with the third part 13 of the foldable screen 10. The shaft cover 232 is located on the side that is of the lifting member 231 and that is away from the lamination surface M3. The shaft cover 232 is configured to prevent moving parts (such as the first rotating shaft 23a, the second rotating shaft 23b, the first swing arm 233, and the second swing arm 233) in the rotation mechanism 23 from being disturbed by the outside. A surface that is of the shaft cover 232 and that is away from the lifting member 231 forms an outer surface of the rotation mechanism 23.

The forcing structure 235 is located between the lifting member 231 and the shaft cover 232, one end of the forcing structure 235 is connected to the lifting member 231, and the other end thereof is connected to the shaft cover 232. The forcing structure 235 is configured to apply a tensile force directed to the shaft cover 232 to the lifting member 231, to drive the lifting member 231 to descend. In some embodiments, still referring to FIG. 6 to FIG. 9, the forcing structure 235 is an elastic member. Optionally, the elastic member is a tower spring. The tower spring is a spiral spring whose spiral radius gradually decreases. One end that is of the tower spring and that is along a telescopic direction is connected to the lifting member 231, and the other end that is of the tower spring and that is along the telescopic direction is connected to the shaft cover 232. When the tower spring is stretched and deformed, an elastic tension force directed to the shaft cover 232 may be applied to the lifting member 231. The lifting member 231 can be driven to descend by using the elastic tension force of the tower spring. Because the tower spring is a spiral spring whose spiral radius gradually decreases, compared with a cylindrical spiral spring, a larger quantity of spiral rings can be formed through spiraling in the tower spring on a premise that a size in the telescopic direction (that is, the height H in FIG. 7) is fixed, so that elasticity of the tower spring is better. In addition, on a premise that the elasticity is the same, the height H of the tower spring can be designed to be small, so that a distance between the lifting member 231 and the shaft cover 232 can be reduced, thereby facilitating thinning of the foldable screen terminal.

Because the tower spring is a spiral spring whose spiral radius gradually decreases, the tower spring includes a smaller-diameter end and a larger-diameter end along the telescopic direction of the tower spring, and a diameter of the larger-diameter end is greater than a diameter of the smaller-diameter end. Optionally, still referring to FIG. 6 to FIG. 9, the smaller-diameter end of the tower spring is connected to the lifting member 231, and the larger-diameter end of the tower spring is connected to the shaft cover 232. In this way, space on a peripheral side of the smaller-diameter end of the tower spring is relatively large, and the first rotating shaft 23a, the second rotating shaft 23b, the first swing arm 233, and the second swing arm 234 can be avoided, to reduce a width of the rotation mechanism 23 in the Y axis direction. In some other embodiments, the smaller-diameter end of the tower spring may alternatively be connected to the lifting member 231, and in this case, the larger-diameter end of the tower spring is connected to the shaft cover 232.

The tower spring and the shaft cover 232, and the tower spring and the lifting member 231 may be detachably connected, or may be non-detachably connected. This is not specifically limited herein.

Figure 13:
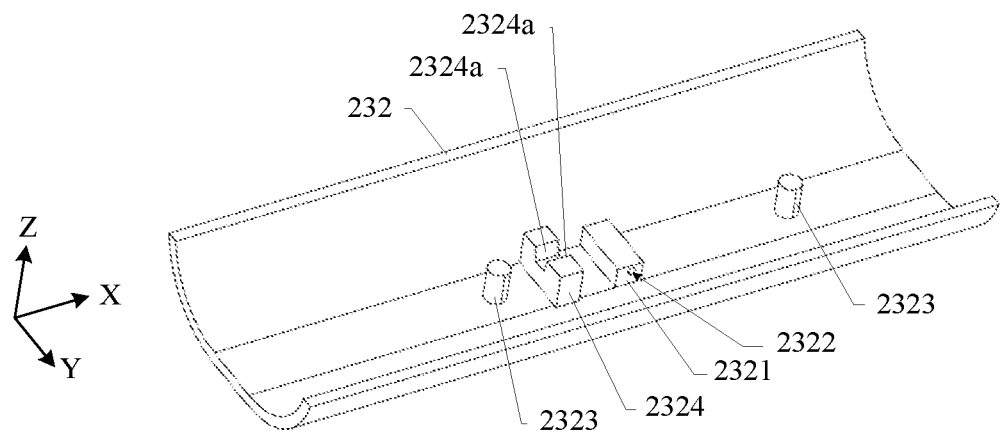
FIG. 13 is a perspective view of a shaft cover in the rotation mechanism shown in FIG. 6 to FIG. 9.
Figure 14:
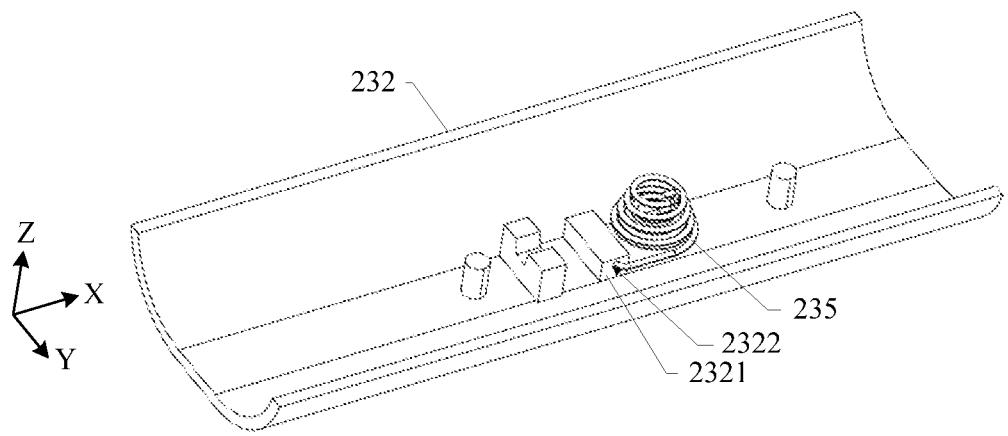
FIG. 14 is a schematic diagram of an assembly structure of a shaft cover and a tower spring in the rotation mechanism shown in FIG. 6 to FIG. 9.

In some embodiments, FIG. 13 is a perspective view of a shaft cover 232 in the rotation mechanism 23 shown in FIG. 6 to FIG. 9. An inner surface of the shaft cover 232 is provided with a fastening block 2321, and the fastening block 2321 is a rectangular parallelepiped structure. In some other embodiments, the fastening block 2321 may alternatively be a cylindrical structure. A fastening hole 2322 is disposed on the fastening block 2321. An axis direction of the fastening hole 2322 extends along the Y axis direction. FIG. 14 is a schematic diagram of an assembly structure of a shaft cover 232 and a tower spring in the rotation mechanism 23 shown in FIG. 6 to FIG. 9. A part of the larger-diameter end of the tower spring penetrates into the fastening hole 2322, and a remaining part is fastened to the inner surface of the shaft cover 232 by using an adhesive. In this way, the fastening block 2321 with high stability fastens and holds the part of the larger-diameter end of the tower spring, and the remaining part of the larger-diameter end is fastened to the shaft cover 232 by using an adhesive or the like, so that both the fastening stability and operation convenience can be achieved. Certainly, the larger-diameter end of the tower spring may be fastened to the inner surface of the shaft cover 232 as a whole by using an adhesive. This is not specifically limited herein. In this embodiment, the fastening manner of the tower spring and the shaft cover 232 is a non-detachable connection manner, to facilitate connection stability.

Figure 15:
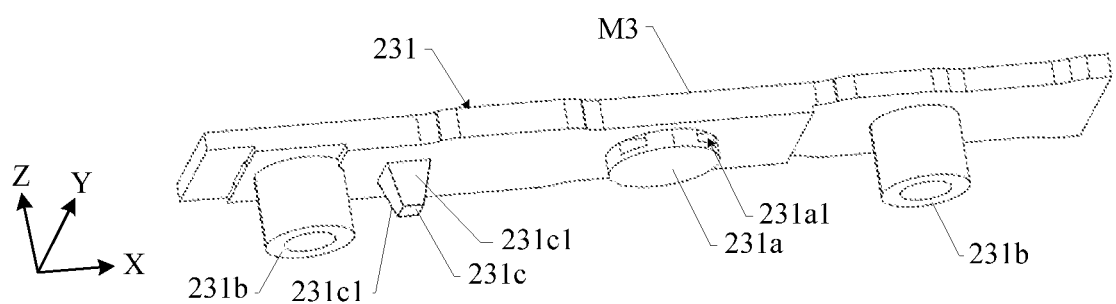
FIG. 15 is a perspective view of a lifting member in the rotation mechanism shown in FIG. 6 to FIG. 9.
Figure 16:
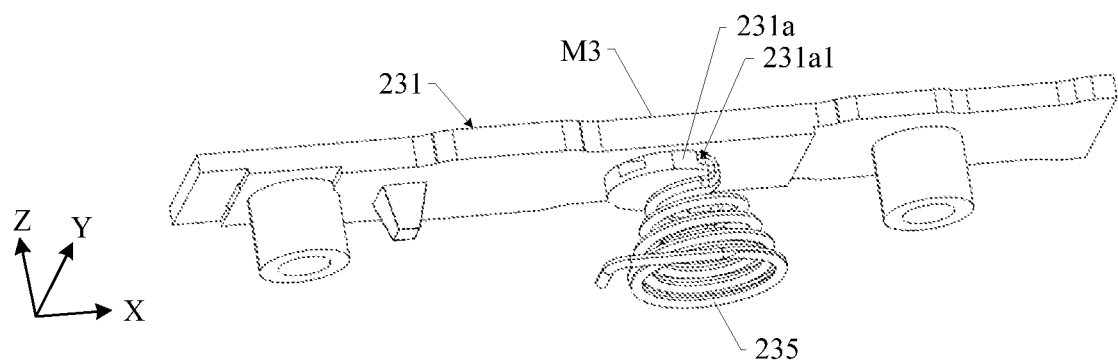
FIG. 16 is a schematic diagram of an assembly structure of a lifting member and a tower spring in the rotation mechanism shown in FIG. 6 to FIG. 9.

FIG. 15 is a perspective view of a lifting member 231 in the rotation mechanism 23 shown in FIG. 6 to FIG. 9. A surface that is of the lifting member 231 and that faces away from the lamination surface M3 is provided with a protrusion portion 231a, and the protrusion portion 231a is cylindrical. In some other embodiments, the protrusion portion 231a may alternatively be square. A hanging hole 231a1 is disposed on the protrusion portion 231a. The hanging hole 231a1 extends along the x axis and penetrates through the protrusion portion 231a. FIG. 16 is a schematic diagram of an assembly structure of a lifting member 231 and a tower spring in the rotation mechanism 23 shown in FIG. 6 to FIG. 9. The smaller-diameter end of the tower spring is hooked in the hanging hole 231a1. In this way, the tower spring is detachably connected to the lifting member 231, to facilitate a connection operation. In some other embodiments, in addition to a hooking connection, the tower spring and the lifting member 231 may be detachably connected by using a clamping connection, a threaded connection, or the like. This is not specifically limited herein.

Based on the foregoing embodiment, because the distance between the lifting member 231 and the shaft cover 232 is small, if the tower spring is directly connected between the lifting member 231 and the shaft cover 232, problems such as much assembling difficulty and mounting inconvenience may be caused due to narrow operation space.

Figure 17:
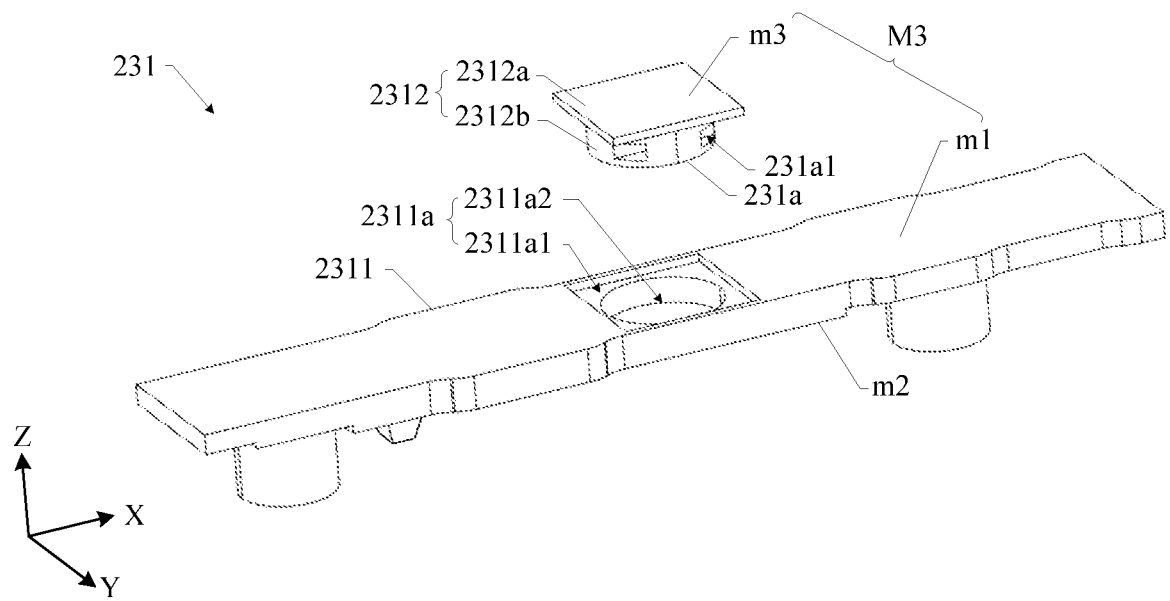
FIG. 17 is an exploded view of a lifting member in the rotation mechanism shown in FIG. 6 to FIG. 9.

To resolve the foregoing problem, referring to FIG. 17, FIG. 17 is an exploded view of a lifting member 231 in the rotation mechanism 23 shown in FIG. 6 to FIG. 9. The lifting member 231 includes a lifting member body 2311 and a buckling member 2312. The lifting member body 2311 includes a first surface m1 and a second surface m2. The first surface m1 is used for lamination with a part of the foldable screen 10, and the second surface m2 is opposite to the first surface m1. When the lifting member 231 is applied to the rotation mechanism 23 shown in FIG. 6 to FIG. 9, the first surface m1 is a surface that is of the lifting member body 2311 and that is away from the tower spring, and the second surface m2 is a surface that is of the lifting member body 2311 and that is close to the tower spring.

A mounting hole 2311a is disposed on the lifting member body 2311. The mounting hole 2311a penetrates through the lifting member body 2311 along a lifting direction of the lifting member 231, one end of the mounting hole 2311a is located on the first surface m1, and the other end of the mounting hole 2311a is located on the second surface m2. The mounting hole 2311a allows the buckling member 2312 to be mounted into the mounting hole 2311a from one end that is of the mounting hole 2311a and that is located on the first surface m1. After the buckling member 2312 is mounted into the mounting hole 2311a, the mounting hole 2311a also prevents the buckling member 2312 from being separated from the mounting hole 2311a from one end that is of the mounting hole 2311a and that is located on the second surface m2.

To achieve the foregoing objective, in some embodiments, still referring to FIG. 17, the mounting hole 2311a includes a first hole segment 2311a1 and a second hole segment 2311a2. The first hole segment 2311a1 is located between the first surface m1 and the second hole segment 2311a2, and the second hole segment 2311a2 is located between the first hole segment 2311a1 and the second surface m2. When the lifting member 231 is applied to the rotation mechanism 23 shown in FIG. 6 to FIG. 9, the second hole segment 2311a2 is located on a side that is of the first hole segment 2311a1 and that is close to the tower spring. A cross section area of the second hole segment 2311a2 is smaller than a cross section area of the first hole segment 2311a1.

Based on the foregoing embodiment, still referring to FIG. 17, the buckling member 2312 includes a supporting portion 2312a and a fastening portion 2312b fastened to the supporting portion 2312a. The supporting portion 2312a matches and is accommodated in the first hole segment 2311a1, and the fastening portion 2312b matches and is accommodated in the second hole segment 2311a2. In this way, the mounting hole 2311a allows the buckling member 2312 to be mounted into the mounting hole 2311a from one end that is of the mounting hole 2311a and that is located on the first surface m1. Based on this, a step surface is formed between an inner wall of the first hole segment 2311a1 and an inner wall of the second hole segment 2311a2, and the supporting portion 2312a of the buckling member 2312 is stopped and limited by using the step surface, so that the buckling member 2312 can be prevented from being separated from the mounting hole 2311a from one end that is of the mounting hole 2311a and that is located on the second surface m2. Certainly, the mounting hole 2311a and the buckling member 2312 may be in another structural from provided that the foregoing objective is achieved. This is not specifically limited herein.

Based on the foregoing embodiment, the smaller-diameter end of the tower spring is detachably connected to the buckling member 2312 in the lifting member 231. Specifically, still referring to FIG. 17, when the buckling member 2312 is mounted into the mounting hole 2311a, a part of the fastening portion 2312b protrudes from the mounting hole 2311a from the second surface m2, and the part protruding from the mounting hole 2311a forms the protrusion portion 231a in FIG. 15 and FIG. 16. The smaller-diameter end of the tower spring is hooked to the hanging hole 231a1 in the protruding portion 231a, so that the tower spring is detachably connected to the buckling member 2312. In some other embodiments, the smaller-diameter end of the tower spring may alternatively be non-detachably connected to the lifting member 231. This is not specifically limited herein.

In this way, the lifting member 231, the tower spring and the shaft cover 232 may be assembled as follows: First, the larger-diameter end of the tower spring is fastened to the inner surface of the shaft cover 232; next, the lifting member body 2311 of the lifting member 231 is disposed on a side that is of the tower spring and that is away from the shaft cover 232, and the mounting hole 2311a is opposite to the smaller-diameter end of the tower spring; then, the smaller-diameter end of the tower spring is pulled out from the mounting hole 2311a to a side that is of the lifting member body 2311 and that is away from the shaft cover 232, and is hooked to the buckling member 2312; and finally, the buckling member 2312 hooked with the tower spring is mounted into the mounting hole 2311a of the lifting member body 2311, to complete assembly. This assembly operation is not difficult and can be easily implemented, and operation of mounting the tower spring in a narrow gap between the lifting member 231 and the shaft cover 232 is avoided.

In the foregoing embodiment, because the tower spring forms the forcing structure 235, the smaller-diameter end of the tower spring is connected to the buckling member 2312, and the diameter of the smaller-diameter end of the tower spring is smaller, a size of the cross section of the mounting hole 2311a can be designed to be small while the smaller-diameter end of the tower spring can penetrate through the mounting hole 2311a to be hooked to the buckling member 2312, so as to ensure structural strength of the lifting member body 2311.

Still referring to FIG. 17, on the buckling member 2312, a surface that is of the supporting portion 2312a and that is away from the fastening portion 2312b is a third surface m3, and the third surface m3 is joined to the first surface m1 of the lifting member body 2311, to form the lamination surface M3 of the lifting member 231. In some embodiments, after the buckling member 2312 is mounted into the mounting hole 2311a in the lifting member body 2311, the third surface m3 is flush with the first surface m1, to ensure flatness of the lamination surface M3. In some other embodiments, the third surface m3 may alternatively be located in the mounting hole 2311a, or may protrude outside the mounting hole 2311a.

In some other embodiments, the tower spring may be replaced with a cylindrical spiral spring, a spring sheet, a leaf spring, a rubber band, or the like. In some other embodiments, the tower spring may alternatively be replaced with a magnetic body assembly including a magnetic body and a magnetic conductive member; the magnetic body in the magnetic body assembly includes, but is not limited to a magnet and a magnetic steel; and one of the magnetic body and the magnetic conductive member is fastened to the lifting member 231 and the other is fastened to the shaft cover 232, and the magnetic body and the magnetic conductive member are spaced apart from each other. In this way, the magnetic body and the magnetic conductive member are attracted to each other to generate a magnetic attraction force, so as to drive the lifting member 231 to descend by using the magnetic attraction force.

To cooperate with the tower spring to drive the lifting member 231 to ascend or descend, referring back to FIG. 7 and FIG. 9, the first supporting member 236 is relatively fastened to the first swing arm 233. Specifically, the first supporting member 236 may be fastened to the first swing arm 233 by using an adhesive, or the first supporting member 236 and the first swing arm 233 may be an integral structural member. The second supporting member 237 is relatively fastened to the second swing arm 234. Specifically, the second supporting member 237 may be fastened to the second swing arm 234 by using an adhesive, or the second supporting member 237 and the second swing arm 234 may be an integral structural member.

Figure 18:
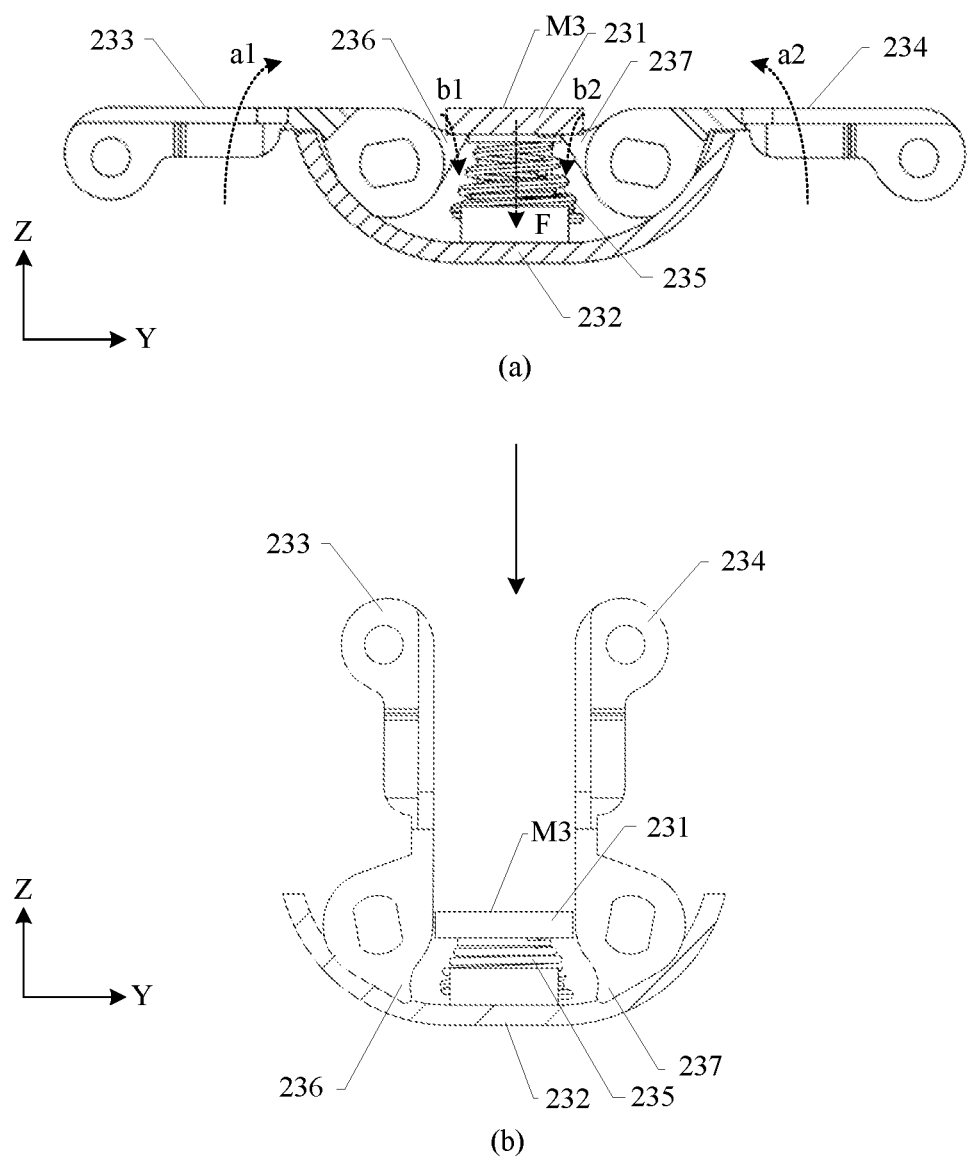
FIG. 18 is a schematic diagram of structures of the rotation mechanism shown in FIG. 9 when a first swing arm and a second swing arm rotate from an unfolded position to a folded position; (a) in FIG. 18 is a schematic diagram of the structure of the rotation mechanism when the first swing arm and the second swing arm are in the unfolded position; and (b) in FIG. 18 is a schematic diagram of the structure of the rotation mechanism when the first swing arm and the second swing arm are in the folded position.

FIG. 18 is a schematic diagram of structures of the rotation mechanism 23 shown in FIG. 9 when a first swing arm 233 and a second swing arm 234 rotate from an unfolded position to a folded position. (a) in FIG. 18 is a schematic diagram of the structure of the rotation mechanism 23 when the first swing arm 233 and the second swing arm 234 are in the unfolded position. In this position, the lifting member 231 is supported on the first supporting member 236 and the second supporting member 237, and the tower spring is stretched and deformed, to apply an elastic tension force F directed to the shaft cover 232 to the lifting member 231. When the first swing arm 233 and the second swing arm 234 swing along the direction a1 and the direction a2 respectively, from the unfolded position to the folded position, the first supporting member 236 and the second supporting member 237 move along the direction b1 and the direction b2 respectively, toward the shaft cover 232, and the lifting member 231 descends under an action of the elastic tension force F of the tower spring. (b) in FIG. 18 is a schematic diagram of the structure of the rotation mechanism 23 when the first swing arm 233 and the second swing arm 234 are in the folded position. In this position, the lifting member 231 descends to a lowest position, so as to avoid a middle portion of the foldable screen and avoid a damage to the foldable screen.

In contrast to the foregoing process, when the first swing arm 233 and the second swing arm 234 swing from the folded position to the unfolded position, the first supporting member 236 and the second supporting member 237 move toward the lifting member 231, to apply a support force to the lifting member 231, and the support force can overcome the elastic tensile force of the tower spring, to drive the lifting member 231 to ascend, so as to support the middle portion of the foldable screen.

Therefore, the first supporting member 236 and the second supporting member 237 cooperate with the tower spring to ascend or descend to drive the lifting member 231, so as to stably support the middle portion of the foldable screen when the first swing arm 233 and the second swing arm 234 are in the unfolded position, and avoid the middle portion of the foldable screen when the first swing arm 233 and the second swing arm 234 are in the folded position.

In some other embodiments, the rotation mechanism 23 may alternatively include only the first supporting member 236 but not include the second supporting member 237. Based on this, the first supporting member 236 may be relatively fastened to the second swing arm 234 in addition to the first swing arm 233. In this way, when the first swing arm 233 and the second swing arm 234 are in the unfolded position, the lifting member 231 is supported only on the first supporting member 236. When the first swing arm 233 and the second swing arm 234 swing from the folded position to the unfolded position, the first supporting member 236 moves toward the lifting member 231, to apply a support force to the lifting member 231. In still some other embodiments, the rotation mechanism 23 may alternatively include only the second supporting member 237, but not include the first supporting member 236.

In the rotation mechanism 23 provided in this embodiment of this application, because the tower spring is directly connected between the lifting member 231 and the shaft cover 232, the thickness of the rotation mechanism 23 is small, thereby facilitating thinning of the foldable screen terminal.

When the first swing arm 233 and the second swing arm 234 are in the folded position, to maintain a position of the lifting member 231 and prevent the lifting member 231 from moving due to an external force or a gravity of the lifting member 231, referring back to FIG. 13, a first stop member 2324 is fastened on the shaft cover 232. The first stop member 2324 includes a first surface region 2324a. A quantity of first surface regions 2324a is two, and the two first surface regions 2324a are disposed symmetrically with respect to a first plane (not shown in the figure). The first plane is parallel to the Z axis. For example, the first plane is parallel to an XZ plane. In some other examples, the first plane may alternatively be parallel to an YZ plane.

Correspondingly, referring to FIG. 15, a second stop member 231c is fastened on the lifting member 231. The second stop member 231c includes a second surface region 231c1. A quantity of second surface regions 231c1 is two, and the two second surface regions 231c1 are disposed symmetrically with respect to a second plane (not shown in the figure). The second plane is parallel to the lifting direction (that is, the Z axis direction) of the lifting member 231, for example, the second plane is parallel to the XZ plane. In some other examples, the second plane may alternatively be parallel to the YZ plane.

Figure 19:
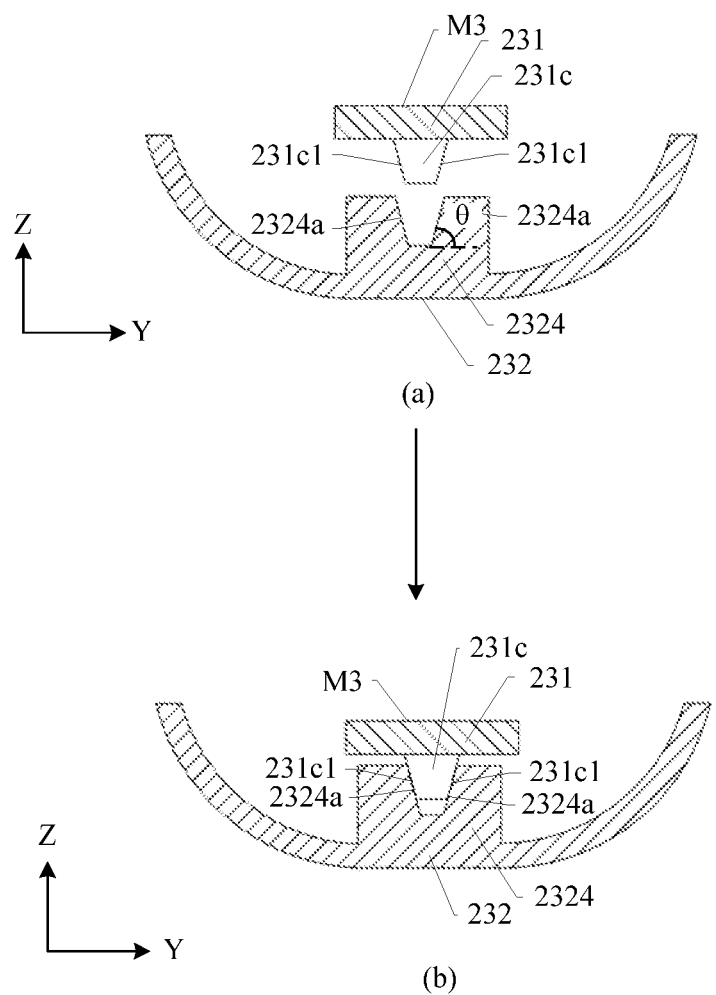
FIG. 19 is a schematic diagram showing relative positions of a first stop member and a second stop member in the rotation mechanism shown in FIG. 6 to FIG. 9 when a first swing arm and a second swing arm are in an unfolded position and a folded position; (a) in FIG. 19 is a schematic diagram showing the relative position of the first stop member and the second stop member in the rotation mechanism when the first swing arm and the second swing arm are in the unfolded position; and (b) in FIG. 19 is a schematic diagram showing the relative position of the first stop member and the second stop member in the rotation mechanism when the first swing arm and the second swing arm are in the folded position.

FIG. 19 is a schematic diagram showing relative positions of a first stop member 2324 and a second stop member 231c in the rotation mechanism 23 shown in FIG. 6 to FIG. 9 when a first swing arm 233 and a second swing arm 234 are in an unfolded position and a folded position. (a) in FIG. 19 is a schematic diagram showing the relative position of the first stop member 2324 and the second stop member 231c in the rotation mechanism 23 when the first swing arm 233 and the second swing arm 234 are in the unfolded position. In this position, the first stop member 2324 and the second stop member 231c are spaced apart from each other, and the first surface region 2324a of the first stop member 2324 and the second surface region 231c1 of the second stop member 231c are spaced apart from each other.

When the first swing arm 233 and the second swing arm 234 swing from the unfolded position to the folded position, the second stop member 231c moves toward the first stop member 2324, to drive the second surface region 231c1 to move toward the first surface region 2324a.

(b) in FIG. 19 is a schematic diagram showing the relative position of the first stop member 2324 and the second stop member 231c in the rotation mechanism 23 when the first swing arm 233 and the second swing arm 234 are in the folded position. In this position, the two first surface regions 2324a of the first stop member 2324 are respectively laminated with the two second surface regions 231c1 of the second stop member 231c. In this way, the two second surface regions 231c1 of the second stop member 231c are stopped by the two first surface regions 2324a of the first stop member 2324, to prevent the lifting member 231 from descending further. Based on this, because the tower spring is connected between the lifting member 231 and the shaft cover 232, and the tower spring can resist deformation, the tower spring can prevent the lifting member 231 from moving away from the shaft cover 232. Therefore, the first stop member 2324 and the second stop member 231c cooperate with the tower spring to limit the lifting member 231, so as to maintain the position of the lifting member 231 when the first swing arm 233 and the second swing arm 234 are in the folded position, and prevent the position of the lifting member 231 from moving due to an external force.

Based on the foregoing embodiment, optionally, the tower spring may be in a free state when the first swing arm 233 and the second swing arm 234 are in the folded position. In this way, the first stop member 2324 and the second stop member 231c cooperate with the tower spring to limit the lifting member 231 to a fixed position, so as to maintain the position of the lifting member 231 to some extent, and prevent an external impact force from forcing the position of the lifting member 231 to change.

Optionally, when the first swing arm 233 and the second swing arm 234 are in the folded position, the tower spring only restores partial deformation and does not completely restore to be in the free state, that is, the tower spring is still in tensile deformation. Therefore, an elastic tension force that is applied by the tower spring to the lifting member 231 and that is directed to the shaft cover 232 is greater than zero. The elastic tensile force presses the lifting member 231 against the first stop member 2324, to improve stability of the position of the lifting member 231 and prevent the external impact force from forcing the position of the lifting member 231 to change. In addition, in this embodiment, it is unnecessary to accurately calculate an elasticity amount and a telescopic amount of the tower spring, so as to ensure that the first surface region 2324a is laminated with the second surface region 231c1 while the tower spring is just restored to the free state, thereby facilitating selection and production of the tower spring.

Based on the foregoing embodiment, to avoid that when the foldable screen terminal is impacted by the external force, the shaft cover 232 in the rotation mechanism 23 transfers the external impact force to the lifting member 231 through the first stop member 2324 and the second stop member 231c, thereby forcing the lifting member 231 to move relative to the shaft cover 232. In some embodiments, referring to FIG. 19, both the first surface region 2324a and the second surface region 231c1 are inclined relative to the lamination surface M3 of the lifting member 231, and an inclination angle is θ. When the first swing arm 233 and the second swing arm 234 are in the folded position, the two first surface regions 2324a are respectively laminated with the two second surface regions 231c1, and a frictional coefficient μ between each first surface region 2324a and the corresponding second surface region 231c1 is greater than a reciprocal of a tangent value of the inclination angle θ of the first surface region 2324a or the second surface region 231c1. That is, μ>1/tan θ. In this way, when an outer surface of the shaft cover 232 is impacted by an external force, the external force is transferred to an inner side of the shaft cover 232 to the first stop member 2324, and the first stop member 2324 cannot drive the second stop member 231c and the lifting member 231 to move. Therefore, the position of the lifting member 231 is further maintained.

In the foregoing embodiment, the quantity of the first surface regions 2324a on the first stop member 2324 and the quantity of the second surface regions 231c1 on the second stop member 231c are both two, the two first surface regions 2324a are disposed symmetrically, and the second surface regions 231c1 are disposed symmetrically. Therefore, forces applied when the first stop member 2324 abuts against the second stop member 231c are balanced, to prevent the rotation mechanism 23 from being stuck during lifting of the lifting member 231.

In some other embodiments, the quantity of first surface regions 2324a on the first stop member 2324 may alternatively be one, three, four, or more. Correspondingly, the quantity of the second surface regions 231c1 on the second stop member 231c may be one, three, four, or more.

Figure 20:
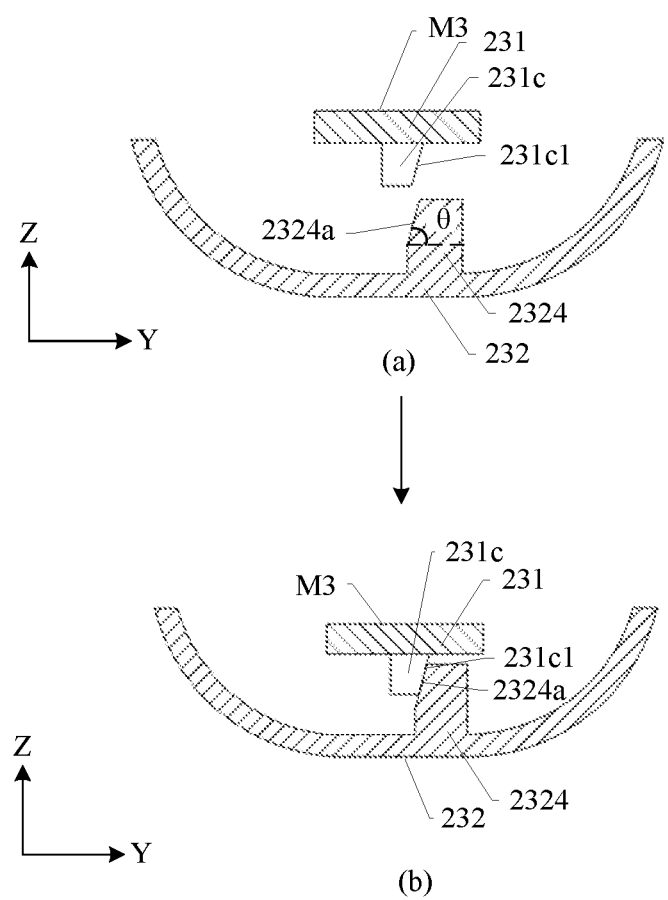
FIG. 20 is a schematic diagram showing relative positions of a first stop member and a second stop member in a rotation mechanism according to some other embodiments of this application when a first swing arm and a second swing arm are in an unfolded position and a folded position; (a) in FIG. 20 is a schematic diagram showing the relative position of the first stop member and the second stop member in the rotation mechanism when the first swing arm and the second swing arm are in the unfolded position; and (b) in FIG. 20 is a schematic diagram showing the relative position of the first stop member and the second stop member in the rotation mechanism when the first swing arm and the second swing arm are in the folded position.

For example, FIG. 20 is a schematic diagram showing relative positions of a first stop member 2324 and a second stop member 231c in a rotation mechanism 23 according to some other embodiments of this application when a first swing arm 233 and a second swing arm 234 are in an unfolded position and a folded position. (a) in FIG. 20 is a schematic diagram showing the relative position of the first stop member 2324 and the second stop member 231c in the rotation mechanism 23 when the first swing arm 233 and the second swing arm 234 are in the unfolded position. (b) in FIG. 20 is a schematic diagram showing the relative position of the first stop member 2324 and the second stop member 231c in the rotation mechanism 23 when the first swing arm 233 and the second swing arm 234 are in the folded position. A difference between the first stop member 2324 and the second stop member 231c in this embodiment and the first stop member 2324 and the second stop member 231c in the rotation mechanism 23 shown in FIG. 19 is as follows: In this embodiment, the quantity of the first surface regions 2324a on the first stop member 2324 is one, and the quantity of the second surface regions 231c1 on the second stop member 231c is also one.

Based on the rotation mechanism 23 described in any one of the foregoing embodiments, to prevent the lifting member 231 from being misaligned during lifting, in some embodiments, referring back to FIG. 13, the rotation mechanism 23 further includes a guide post 2323. The guide post 2323 is disposed on the shaft cover 232, and an axis direction of the guide post 2323 coincides with the lifting direction of the lifting member. A quantity of the guide posts 2323 is two, and the two guide posts 2323 are spaced apart from each other along a length direction of the shaft cover 232 (that is, the X axis direction). In some other embodiments, the quantity of the guide posts 2323 may alternatively be one, three, four, or the like. This is not specifically limited herein.

Correspondingly, referring to FIG. 15, the rotation mechanism 23 further includes a guide sleeve 231b. The guide sleeve 231b is disposed on the lifting member 231, and an axis direction of the guide sleeve 231b coincides with the lifting direction of the lifting member 231. A quantity of the guide sleeves 231b is two. When the quantity of the guide posts 2323 is one, three, or four, correspondingly, the quantity of the guide sleeves 231b is also one, three, or four.

Figure 21:
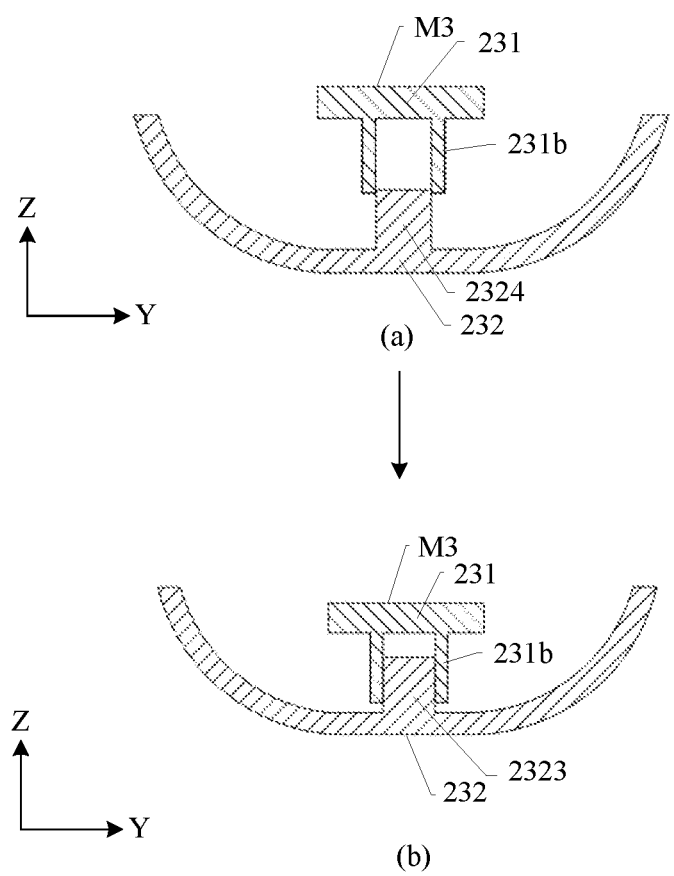
FIG. 21 is a schematic diagram showing relative positions of a guide post and a guide sleeve in the rotation mechanism shown in FIG. 6 to FIG. 9 when a first swing arm and a second swing arm are in an unfolded position and a folded position; (a) in FIG. 21 is a schematic diagram showing the relative position of the guide post and the guide sleeve in the rotation mechanism when the first swing arm and the second swing arm are in the unfolded position; and (b) in FIG. 21 is a schematic diagram showing the relative position of the guide post and the guide sleeve in the rotation mechanism when the first swing arm and the second swing arm are in the folded position.

FIG. 21 is a schematic diagram showing relative positions of a guide post 2323 and a guide sleeve 231b in the rotation mechanism 23 shown in FIG. 6 to FIG. 9 when a first swing arm 233 and a second swing arm 234 are in an unfolded position and a folded position. (a) in FIG. 21 is a schematic diagram showing the relative position of the guide post 2323 and the guide sleeve 231b in the rotation mechanism 23 when the first swing arm 233 and the second swing arm 234 are in the unfolded position. (b) in FIG. 21 is a schematic diagram showing the relative position of the guide post 2323 and the guide sleeve 231b in the rotation mechanism 23 when the first swing arm 233 and the second swing arm 234 are in the folded position. The guide sleeve 231b is disposed outside the guide post 2323, and the guide post 2323 slides in the guide sleeve 231b relative to the guide sleeve 231b when the lifting member 231 descends or ascends relative to the shaft cover 232. In this way, the guide post 2323 and the guide sleeve 231b can guide a lifting movement of the lifting member 231, to prevent the lifting member 231 from being misaligned during lifting.

In some other embodiments, a disposed position of the guide post 2323 and a disposed position of the guide sleeve 231b are interchangeable, that is, the guide post 2323 is disposed on the lifting member 231, and the guide sleeve 231b is disposed on the shaft cover 232.

Figure 22:
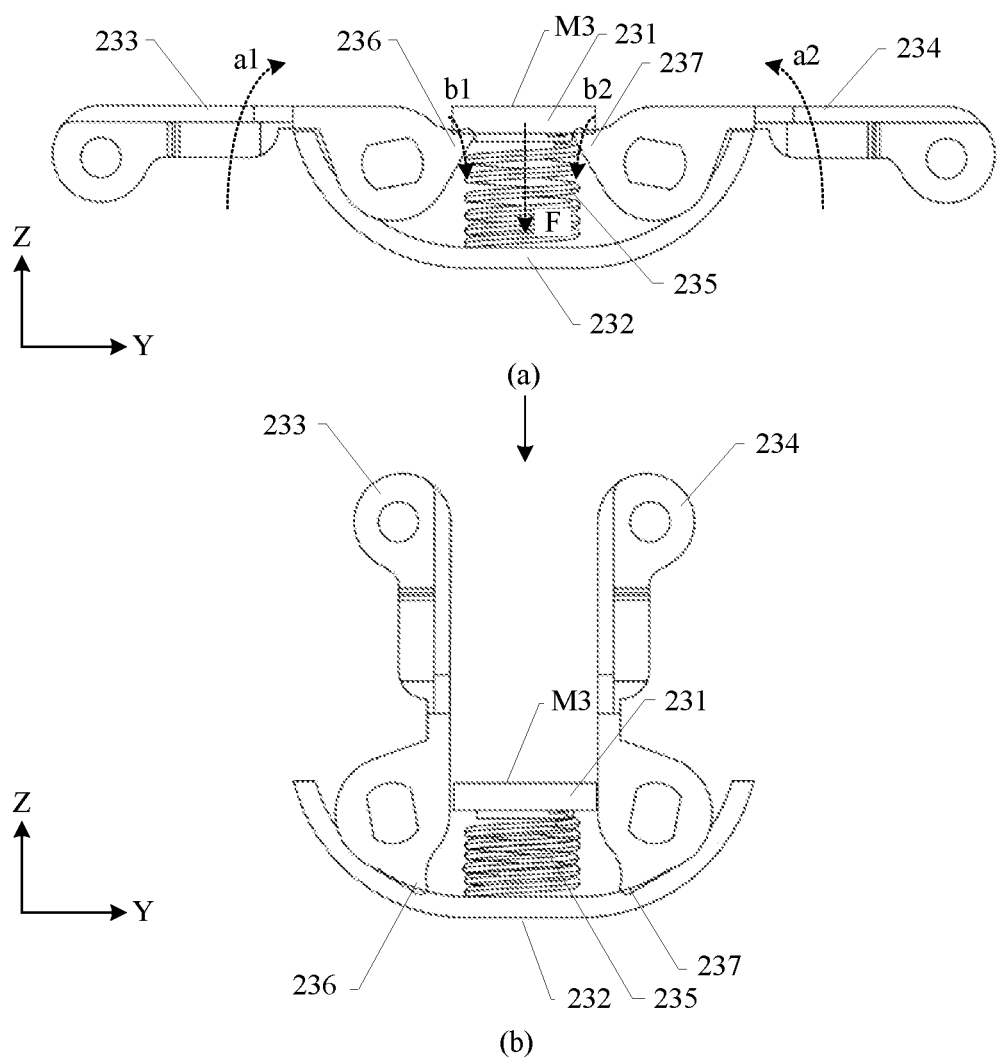
FIG. 22 is a schematic diagram of structures of a rotation mechanism according to some other embodiments of this application when a first swing arm and a second swing arm rotate from an unfolded position to a folded position; (a) in FIG. 22 is a schematic diagram of the structure of the rotation mechanism when the first swing arm and the second swing arm are in the unfolded position; and (b) in FIG. 22 is a schematic diagram of the structure of the rotation mechanism when the first swing arm and the second swing arm are in the folded position.

FIG. 22 is a schematic diagram of structures of a rotation mechanism 23 according to some other embodiments of this application when a first swing arm 233 and a second swing arm 234 rotate from an unfolded position to a folded position. (a) in FIG. 22 is a schematic diagram of the structure of the rotation mechanism 23 when the first swing arm 233 and the second swing arm 234 are in the unfolded position. (b) in FIG. 22 is a schematic diagram of the structure of the rotation mechanism 23 when the first swing arm 233 and the second swing arm 234 are in the folded position. A difference between the rotation mechanism 23 shown in this embodiment and the rotation mechanism 23 shown in FIG. 6 to FIG. 9 is as follows: In this embodiment, the forcing structure 235 is a cylindrical spiral spring. A movement manner and a forcing manner of the cylindrical spiral spring during lifting of the lifting member 231 are the same as the movement manner and the forcing manner of the tower spring described above. Details are not described herein again.

Figure 23:
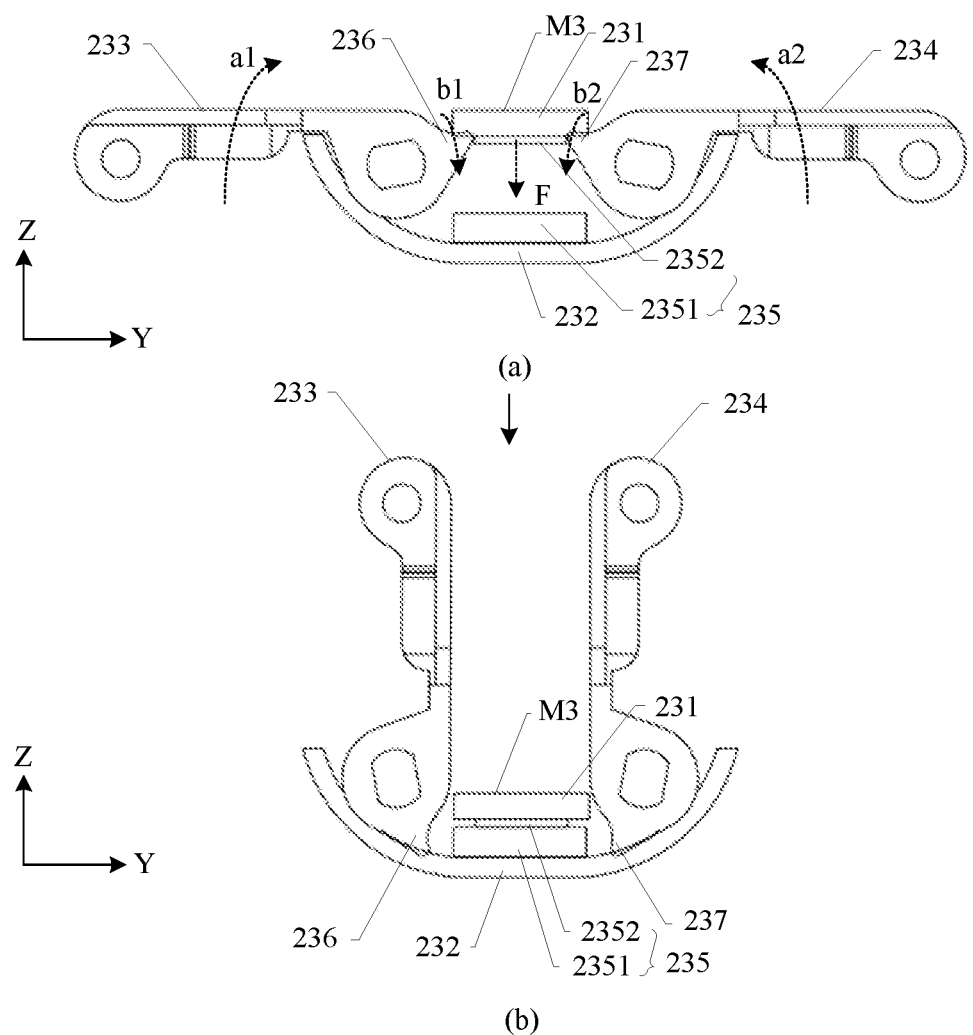
FIG. 23 is a schematic diagram of structures of a rotation mechanism according to still some other embodiments of this application when a first swing arm and a second swing arm rotate from an unfolded position to a folded position; (a) in FIG. 23 is a schematic diagram of the structure of the rotation mechanism when the first swing arm and the second swing arm are in the unfolded position; and (b) in FIG. 23 is a schematic diagram of the structure of the rotation mechanism when the first swing arm and the second swing arm are in the folded position.

FIG. 23 is a schematic diagram of structures of a rotation mechanism 23 according to still some other embodiments of this application when a first swing arm 233 and a second swing arm 234 rotate from an unfolded position to a folded position. A difference between the rotation mechanism 23 shown in this embodiment and the rotation mechanism 23 shown in FIG. 6 to FIG. 9 is as follows: In this embodiment, the forcing structure 235 is a magnetic body assembly including a magnetic body 2351 and a magnetic conductive member 2352. The magnetic body 2351 in the magnetic body assembly includes, but is not limited to, a magnet and a magnetic steel. The magnetic body 2351 is fastened on the shaft cover 232, and the magnetic conductive member 2352 is fastened on the lifting member 231.

When the first swing arm 233 and the second swing arm 234 are in the unfolded position, (a) in FIG. 23 is a schematic diagram of the structure of the rotation mechanism 23 when the first swing arm 233 and the second swing arm 234 are in the unfolded position. The magnetic body 2351 and the magnetic conductive member 2352 are spaced apart from each other, and the magnetic body 2351 and the magnetic conductive member 2352 are attracted to each other, to generate a magnetic attraction force F. When the first swing arm 233 and the second swing arm 234 swing along the direction a1 and the direction a2 respectively, from the unfolded position to the folded position, the first supporting member 236 and the second supporting member 237 respectively move along the direction b1 and the direction b2, toward the shaft cover 232, and the lifting member 231 descends under an action of the magnetic attraction force F, to drive the magnetic conductive member 2352 to move toward the magnetic body 2351. (b) in FIG. 23 is a schematic diagram of the structure of the rotation mechanism 23 when the first swing arm 233 and the second swing arm 234 are in the folded position. In this position, the magnetic conductive member 2352 and the magnetic body 2351 attract each other, and the lifting member 231 descends to a lowest position. Therefore, the middle portion of the foldable screen can be avoided, to avoid the damage to the foldable screen.

In contrast to the foregoing process, when the first swing arm 233 and the second swing arm 234 swing from the folded position to the unfolded position, the first supporting member 236 and the second supporting member 237 move toward the lifting member 231, to apply a support force to the lifting member 231, and the support force can overcome the elastic tensile force between the magnetic conductive member 2352 and the magnetic body 2351, to drive the lifting member 231 to ascend, so as to support the middle portion of the foldable screen.

Therefore, the first supporting member 236 and the second supporting member 237 cooperate with the magnetic conductive member 2352 and the magnetic body 2351 to drive the lifting member 231 to ascend or descend, so as to stably support the middle portion of the foldable screen when the first swing arm 233 and the second swing arm 234 are in the unfolded position, and avoid the middle portion of the foldable screen when the first swing arm 233 and the second swing arm 234 are in the folded position.

In some other embodiments, a disposing position of the magnetic bodies 2351 and a disposing position of the magnets 2352 are interchangeable. That is, the magnetic body 2351 is disposed on the lifting member 231, and the magnetic conductive member 2352 is disposed on the shaft cover 232.

Based on descriptions of the foregoing embodiments, in the rotation mechanism 23 provided in this embodiment of this application, because the forcing structure 235 is directly connected between the lifting member 231 and the shaft cover 232, the thickness of the rotation mechanism 23 is small, thereby facilitating thinning of the foldable screen terminal.

In descriptions of this specification, specific features, structures, materials or characteristics may be combined in any one or more embodiments or examples in a suitable manner.

Finally, it should be noted that the foregoing embodiments are only used to illustrate the technical solutions of this application, but are not used to limit this application. Although this application has been described in detail with reference to the foregoing embodiments, it should be understood by a person of ordinary skill in the art that the technical solutions described in the foregoing embodiments may still be modified, or some technical features thereof are equivalently replaced. These modifications or replacements do not make the essence of the corresponding technical solutions depart from the spirit and scope of the technical solutions of the embodiments of this application.

What is claimed is:

1. A rotation mechanism, comprising a lifting member, a shaft cover, a first swing arm, a second swing arm, a forcing structure, and a first supporting member, wherein
   the lifting member comprises a lamination surface, and the lamination surface is used for lamination with a part of a foldable screen; and the shaft cover is located on a side that is of the lifting member and that is away from the lamination surface;
   the first swing arm and the second swing arm are respectively located on two opposite sides of the lifting member, and the first swing arm and the second swing arm can swing between an unfolded position and a folded position relative to the shaft cover;
   the forcing structure is located between the lifting member and the shaft cover, one end of the forcing structure is connected to the lifting member, and the other end thereof is connected to the shaft cover; and the first supporting member is relatively fastened to the first swing arm or the second swing arm; and
   when the first swing arm and the second swing arm are in the unfolded position, the lifting member is supported on the first supporting member, and the forcing structure applies a tensile force directed to the shaft cover to the lifting member; and when the first swing arm and the second swing arm swing from the unfolded position to the folded position, the first supporting member moves toward the shaft cover, and the lifting member descends under an action of the tension force of the forcing structure;
   wherein the lifting member comprises a lifting member body and a buckling member;
   a mounting hole is disposed on the lifting member body, the mounting hole penetrates through the lifting member body along a lifting direction of the lifting member; the mounting hole allows the buckling member to be mounted into the mounting hole from one end that is of the mounting hole and that is away from the elastic member; after the buckling member is mounted into the mounting hole, the mounting hole also prevents the buckling member from being separated from the mounting hole from one end that is of the mounting hole and that is close to the elastic member; and the elastic member is detachably connected to the buckling member;
   wherein the mounting hole comprises a first hole segment and a second hole segment, the second hole segment is located on a side that is of the first hole segment and that is close to the elastic member, and a cross section area of the second hole segment is smaller than a cross section area of the first hole segment; and
   the buckling member comprises a supporting portion and a fastening portion, the supporting portion matches and is accommodated in the first hole segment, and the fastening portion matches and is accommodated in the second hole segment.

2. The rotation mechanism according to claim 1, wherein when the first swing arm and the second swing arm swing from the folded position to the unfolded position, the first supporting member moves toward the lifting member, to apply a support force to the lifting member, and the support force can overcome the tensile force of the forcing structure, to drive the lifting member to ascend.

3. The rotation mechanism according to claim 1, wherein the forcing structure is an elastic member, one end that is of the elastic member and that is along a telescopic direction is connected to the lifting member, and the other end thereof along a telescopic direction is connected to the shaft cover; and when the first swing arm and the second swing arm are in the unfolded position, the elastic member applies an elastic tensile force directed to the shaft cover to the lifting member, and when the first swing arm and the second swing arm swing from the unfolded position to the folded position, the lifting member descends under an action of the elastic tensile force of the forcing structure.

4. The rotation mechanism according to claim 3, wherein the elastic member is a tower spring.

5. The rotation mechanism according to claim 4, wherein the tower spring comprises two ends along the telescopic direction, a smaller-diameter end is connected to the lifting member, and a larger-diameter end is connected to the shaft cover.

6. The rotation mechanism according to claim 1, further comprising: a guide post and a guide sleeve, wherein one of the guide post and the guide sleeve is disposed on the lifting member, and the other is disposed on the shaft cover, an axis direction of the guide post and an axis direction of the guide sleeve coincide with the lifting direction of the lifting member, the guide post is sleeved in the guide sleeve, and the guide post slides in the guide sleeve relative to the guide sleeve when the lifting member descends or ascends relative to the shaft cover.

7. The rotation mechanism according to claim 1, wherein a first stop member is fastened on the shaft cover, and the first stop member comprises a first surface region;

a second stop member is fastened on the lifting member, and the second stop member comprises a second surface region; and when the first swing arm and the second swing arm are in the folded position, the first stop member is laminated with the second surface region of the second stop member by using the first surface region.

8. The rotation mechanism according to claim 7, wherein when the first swing arm and the second swing arm are in the folded position, the tensile force that is applied by the forcing structure to the lifting member and that is directed to the shaft cover is greater than zero.

9. The rotation mechanism according to claim 7, wherein both the first surface region and the second surface region are inclined relative to the lamination surface, and when the first swing arm and the second swing arm are in the folded position, a frictional coefficient between the first surface region and the second surface region is greater than a reciprocal of a tangent value of an inclination angle of the first surface region or the second surface region.

10. The rotation mechanism according to claim 7, wherein a quantity of the first surface regions is two, the two first surface regions are disposed symmetrically with respect to a plane parallel to the lifting direction of the lifting member, a quantity of the second surface regions is also two, and the two second surface regions are disposed symmetrically with respect to the plane parallel to the lifting direction of the lifting member; and when the first swing arm and the second swing arm are in the folded position, the two first surface regions of the first stop member are respectively laminated with the two second surface regions of the second stop member.

11. The rotation mechanism according to claim 1, wherein the first supporting member is relatively fastened to the first swing arm, the rotation mechanism further comprises a second supporting member, and the second supporting member is relatively fastened to the second swing arm; and when the first swing arm and the second swing arm are in the unfolded position, the lifting member is supported on the first supporting member and the second supporting member; and when the first swing arm and the second swing arm swing from the unfolded position to the folded position, both the first supporting member and the second supporting member move toward the shaft cover.

12. A supporting apparatus, comprising a first housing, a second housing, and the rotation mechanism according to claim 1, wherein the rotation mechanism is located between the first housing and the second housing, and a first swing arm of the rotation mechanism is connected to the first housing, and a second swing arm of the rotation mechanism is connected to the second housing.

13. A foldable screen terminal, comprising a foldable screen and the supporting apparatus according to claim 12, wherein the foldable screen comprises a first part, a second part, and a third part, the third part is located between the first part and the second part, and the first part is supported and fastened on a first housing, the second part is supported and fastened on a second housing, and the third part is supported on a rotation mechanism of the supporting apparatus.

* * * * *